United States Patent
Okamoto

(10) Patent No.: US 8,594,911 B2
(45) Date of Patent: Nov. 26, 2013

(54) ACTIVE ANTI-VIBRATION SUPPORTING DEVICE AND ANTI-VIBRATION CONTROL METHOD FOR SAME

(75) Inventor: Hideyuki Okamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/382,756

(22) PCT Filed: Jul. 5, 2010

(86) PCT No.: PCT/JP2010/061375
§ 371 (c)(1),
(2), (4) Date: Jan. 6, 2012

(87) PCT Pub. No.: WO2011/004784
PCT Pub. Date: Jan. 13, 2011

(65) Prior Publication Data
US 2012/0109456 A1    May 3, 2012

(30) Foreign Application Priority Data

Jul. 8, 2009    (JP) ................................. 2009-162232

(51) Int. Cl.
*G06F 19/00*    (2011.01)
*G06F 17/00*    (2006.01)
*F16F 15/00*    (2006.01)

(52) U.S. Cl.
USPC .......................... 701/111; 701/47; 267/140.15

(58) Field of Classification Search
USPC ............ 701/36, 47, 111; 267/140.15, 140.14, 267/141; 73/1.82, 11.04, 11.08, 11.09, 73/35.09, 570, 649, 660; 700/280
See application file for complete search history.

(56) References Cited

U.S. PATENT DOCUMENTS

| 7,021,611 | B2 | 4/2006 | Nemoto |
| 8,346,460 | B2 * | 1/2013 | Okamoto et al. ............. 701/111 |
| 2004/0060792 | A1 | 4/2004 | Warmerdam |
| 2004/0070126 | A1 * | 4/2004 | Nemoto ................... 267/140.14 |
| 2005/0006830 | A1 * | 1/2005 | Nemoto ................... 267/140.14 |

(Continued)

FOREIGN PATENT DOCUMENTS

| CN | 2308763 Y | 2/1999 |
| CN | 1623814 A | 6/2005 |

(Continued)

*Primary Examiner* — Fadey Jabr
*Assistant Examiner* — Thomas Ingram
(74) *Attorney, Agent, or Firm* — Carrier Blackman & Associates, P.C.; Joseph P. Carrier; William D. Blackman

(57) ABSTRACT

An ACM_ECU (200) estimates an engine vibration state in a first cycle (C1) of engine vibration on the basis of signal outputs from a TDC sensor (Sb) and a crank pulse sensor (Sa) and calculates a target current value waveform having a cycle length (T1). The ACM_ECU (200) then samples the target current value waveform at a constant sampling rate, thereby obtaining, for example, an aggregate of the data of target current values (Fr_ICMD) for a driving unit for driving an active control mount (MF) on the front side (Fr side). After that, the ACM_ECU (200) estimates the cycle length (T3') of a third cycle (C3) of the engine vibration on the basis of a predetermined number of crank pulse intervals at a timing when the data of the target current values (Fr_ICMD) are output to the driving unit (41). The obtained aggregate of the data of target current values is corrected so as to correspond to the estimated cycle length (T3') and fed to the driving unit (41).

6 Claims, 17 Drawing Sheets

(56) References Cited

U.S. PATENT DOCUMENTS

| | | |
|---|---|---|
| 2005/0085969 A1 | 4/2005 | Kim |
| 2005/0184214 A1 | 8/2005 | Mizushima et al. |
| 2007/0029713 A1* | 2/2007 | Shin et al. ............... 267/140.15 |
| 2009/0039577 A1* | 2/2009 | Ishiguro et al. .......... 267/140.13 |
| 2009/0256294 A1* | 10/2009 | Lee et al. ................. 267/140.14 |
| 2010/0305837 A1* | 12/2010 | Gagliano ...................... 701/111 |

FOREIGN PATENT DOCUMENTS

| | | |
|---|---|---|
| CN | 1658101 A | 8/2005 |
| CN | 1685168 A | 10/2005 |
| JP | 2002-096645 A | 4/2002 |
| JP | 2004-036754 A | 2/2004 |
| JP | 2005-003052 A | 1/2005 |
| JP | 3819876 B | 6/2006 |

* cited by examiner

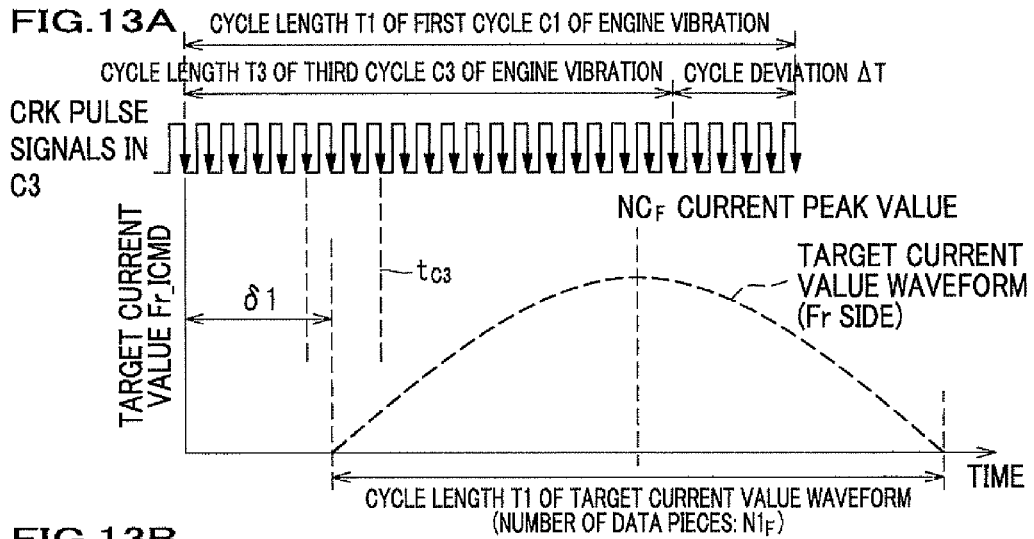
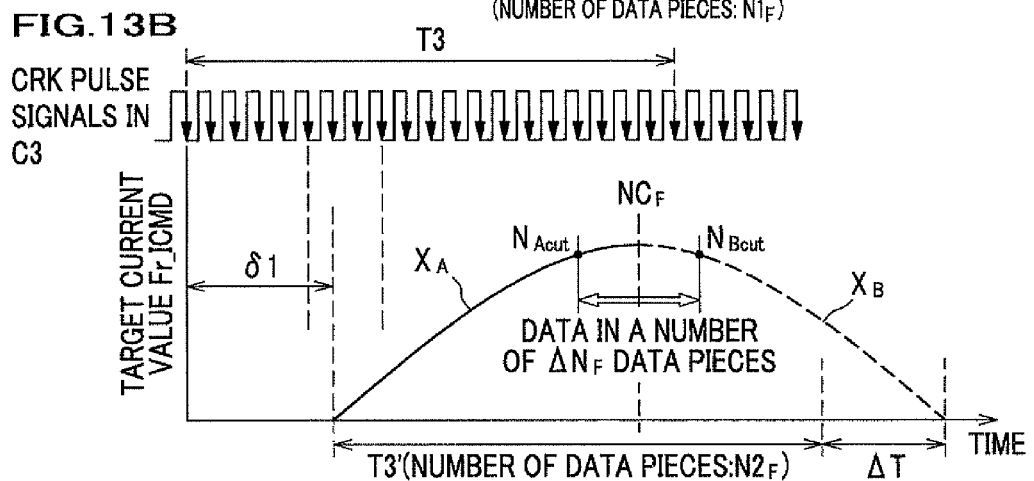
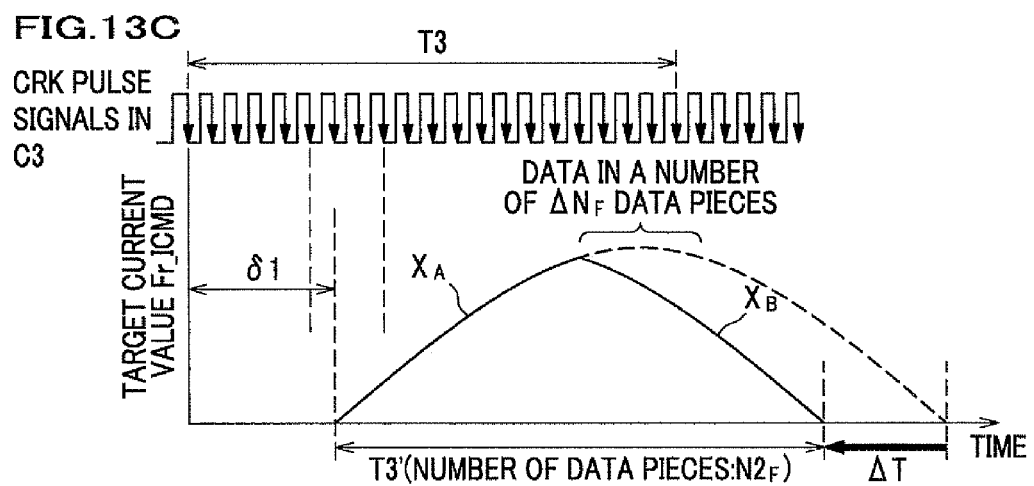

ACTIVE ANTI-VIBRATION SUPPORTING DEVICE AND ANTI-VIBRATION CONTROL METHOD FOR SAME

TECHNICAL FIELD

The present invention relates to an active anti-vibration supporting device that supports a vehicle engine with respect to a vehicle body and a method of anti-vibration control for the same.

BACKGROUND ART

Patent Document 1 discloses a technology for an active anti-vibration supporting device. According to the known technology described in Patent Document 1, computed is a target lift amount of a movable member of an actuator of an active control mount, based on outputs from an engine rotation speed sensor, a load sensor, and an acceleration sensor in one vibration cycle of an engine.

Then, based on the computed target lift amount, determined is the duty ratio of a duty group that controls a drive current to be output to the actuator in the next vibration cycle. Simultaneously, also determined is a phase delay, which is the timing of the start of the duty group.

Then, in further subsequent vibration cycles, based on the first, the second, the third, . . . duty groups computed correspondingly to the lengths T1, T2, T3, . . . of vibration cycles of the engine vibration, the actuator of the active anti-vibration supporting device is driven. As the lengths T1, T2, T3, . . . , of the vibration cycles of the engine gradually become shorter with increase in the rotation speed of the engine, a current supplied to the actuator does not become zero at the respective ends of the first, second, third, . . . duty groups. Consequently, the peak value of the current gradually increases, which not only disables an effective anti-vibration function of the active anti-vibration supporting device, but also causes a possibility that the actuator generates heat.

In this situation, according to the known technology described in Patent Document 1, in a case, for example, that that the overlapping amount between the first and second duty groups exceeds a threshold value, the duty ratio of the second duty group is set to zero so that supply of current to the actuator is stopped.

BACKGROUND ART DOCUMENT

Patent Document

Patent Document 1: Japanese Patent Application Laid-Open 2005-3052

DISCLOSURE OF THE INVENTION

Problems to be Solved by the Invention

In the technology disclosed by Patent Document 1, arrangement is made such that, for example, in a case that the overlap amount between first and second duty groups has exceeded a threshold, the duty ratio of the second duty group is made zero and current supply to an actuator is stopped. As a result, it may occur that current output to the actuator is missed in continuous plural vibration cycles of an engine, which causes a problem that control of anti-vibration against engine vibration cannot be sufficiently performed.

In this situation, an object of the present invention is to provide an active anti-vibration supporting device and a method of anti-vibration control for the same, which enable an anti-vibration function against engine vibration without stopping current supply to an actuator.

Means for Solving the Problems

According to a first aspect of the present invention, there is provided an active anti-vibration supporting device that supports an engine with respect to a vehicle body, wherein, based on output from a sensor for detecting rotation variation of the engine, a control unit for estimating a vibration state of the engine expandingly/contractingly drives an actuator to reduce transmission of vibration, wherein the control unit: computes a target current value waveform for reducing transmission of vibration of the engine, using output data from the sensor, and obtains a data group of target current values from the target current value waveform in a predetermined sampling cycle; estimates a cycle length of the engine vibration, based on a certain time defined by a rotation speed of the engine at a drive timing of the actuator driven based on the target current value waveform; and corrects the obtained data group of target current values so that the data group of target current values comes to correspond to the estimated cycle length of the engine vibration and then supply current to the actuator.

According to the first aspect, a control unit computes a target current value waveform for reducing transmission of engine vibration, using output data from a sensor, and obtains a data group of target current values from the target current values in a predetermined sampling cycle. The control unit estimates a cycle length of the engine vibration, based on a certain time defined by the rotation speed of the engine at a timing of driving an actuator, corrects the obtained data group of target current values so that the data group comes to correspond to the estimated cycle length of the engine vibration, and then supplies current to the actuator.

As a result, it is possible to output the number of data pieces included in the data group of target current values after correcting the number of data pieces into an appropriate number of data pieces that matches with the cycle length of the engine vibration at the time of supplying current to the actuator. Accordingly, the active anti-vibration supporting device can be appropriately controlled.

In the active anti-vibration supporting device according to a second aspect of the present invention, in addition to the arrangement according to the first aspect, the control unit includes: a vibration state estimation unit for estimating an amplitude and a cycle length of engine vibration, using the output data from the sensor for detecting rotation variation of the engine; a target current computation unit for computing the target current value waveform for driving the actuator, based on the amplitude and the cycle length estimated by the vibration state estimation unit; a target-current-value-group generation unit for obtaining the data group of target current values from the target current value waveform computed by the target current computation unit in the predetermined sampling cycle; a vibration-cycle-during-driving estimation unit for estimating the cycle length of the engine vibration, based on the certain time defined by the rotation speed of the engine at the drive timing of the actuator; a current supply control unit for controlling current supply to the actuator; and an output-time correction unit that corrects the obtained data group of target current values so that the data group of target current values comes to correspond to the cycle length of the engine vibration estimated by the vibration-cycle-during-driving estimation unit, and then outputs the corrected data group of target current values to the actuator.

According to the second aspect, the control unit, first, corrects the number of data pieces included in the obtained data group of target current values by a target-current-value-group generation unit into an appropriate number of data pieces by an output-time correction unit so that the number of data pieces comes to correspond to a cycle length of the engine vibration estimated by a vibration-cycle-during-driving estimation unit, and thereafter outputs the corrected data group of target current values to a current supply control unit. Accordingly, it is possible to appropriately perform control of the active anti-vibration supporting device.

In the active anti-vibration supporting device according to a third aspect of the present invention, in addition to the arrangement according to the second aspect, the output-time correction unit: in a case that the rotation speed of the engine is accelerated, outputs the obtained data group of target current values with a jump over a certain number of data pieces around a peak value in the obtained data group of target current values so that a number of data pieces of the data group of target current values comes to correspond to the cycle length of the engine vibration estimated by the vibration-cycle-during-driving estimation unit; and in a case that the rotation speed of the engine is decelerated, outputs the obtained data group of target current values with a repeat of the peak value in the obtained data group of target current values for a certain number of times so that a number of data pieces of the data group of target current values comes to correspond to the cycle length of the engine vibration estimated by the vibration-cycle-during-driving estimation unit.

According to the third aspect, in a case that the rotation speed of the engine is accelerated at a timing of driving the actuator, the output-time correction unit outputs the obtained data group of target current values with a jump over a certain number of data pieces around a peak value in the obtained data group of target current values so that a number of data pieces of the data group of target current values comes to correspond to the cycle length of the engine vibration estimated by the vibration-cycle-during-driving estimation unit. Accordingly, it is possible to appropriately control driving of the actuator without overlapping with output of target current values which are for the next vibration cycle of the engine to the actuator. In an opposite case where rotation speed of the engine is decelerated, the output-time correction unit outputs the obtained data group of target current values with a repeat for a certain number of times of a peak value in the obtained data group of target current values so that a number of data pieces of the data group of target current values comes to correspond to the cycle length of the engine vibration estimated by the vibration-cycle-during-driving estimation unit. Accordingly, it is possible to prevent that a wasteful period with no supply current occurs before output of target current values for the next vibration cycle of the engine, and thus appropriately control driving of the actuator. As a result, it is possible to output a target current value waveform corresponding to a cycle length of the engine vibration at a timing of driving the actuator, and thus smoothly drive the actuator.

The active anti-vibration supporting device according to a fourth aspect of the present invention, in addition to the arrangement according to the first aspect, wherein the control unit: measures crank pulse signals from the sensor based on rotation of the engine; in a subsequent second vibration cycle computes the target current value waveform to be applied to the actuator for anti-vibration, using data of crank pulse signals belonging to a first vibration cycle out of cycles of the engine vibration; and in a subsequent third vibration cycle controls driving of the actuator, using the computed target current value waveform. In the second vibration cycle of the engine vibration, the control unit estimates an amplitude and a cycle length of the engine vibration in the first vibration cycle of the engine vibration, using the data of the crank pulse signals belonging to the first vibration cycle of the engine vibration, and computes the target current value waveform for driving the actuator, based on the estimated amplitude and the estimated cycle length. The control unit further obtains a data group of target current values from the computed target current value waveform in a predetermined sampling cycle. In the third vibration cycle of the engine vibration, the control unit detects the certain time defined by the rotation speed of the engine, corrects the obtained data group of target current values, based on the detected certain time, so that the corrected data group of target current values comes to correspond to a cycle length of the third vibration cycle, and then drives the actuator.

According to the fourth aspect, in the second vibration cycle of the engine vibration, the control unit estimates an amplitude and a cycle length of the engine vibration in the first vibration cycle of the engine vibration, and computes a target current value waveform for driving the actuator, based on the estimated amplitude and the estimated cycle length. The control unit further obtains a data group of target current values from the computed target current value waveform in a predetermined sampling cycle. In the third vibration cycle of the engine vibration, the control unit detects the certain time defined by the rotation speed of the engine, corrects the obtained data group of target current values, based on the detected certain time, so that the corrected data group of target current values comes to correspond to the cycle length of the third vibration cycle. As a result, it is possible to output the data group of target current values after correcting the number of data pieces included in the data group of target current values into a number of data pieces that is appropriate for the cycle length of the engine vibration at the time of supplying current to the actuator.

The active anti-vibration supporting device according to a fifth aspect of the present invention, in addition to the arrangement according to the first aspect, the control unit is configured to compute a target current value waveform for reducing transmission of the engine vibration, using the output data from the sensor, and obtain a data group of target current values from the target current value waveform in the predetermined sampling cycle; and based on a position of data of a target current value, in the data group of target current values, that is output at a predetermined timing based on a signal from the sensor, adjust a number of data pieces of a data portion having not yet been output of the data group of target current values which are being output so that the number of data pieces comes to correspond to a then cycle length of the engine vibration, and then supply current to the actuator.

According to the fifth aspect, the control unit is configured to compute a target current value waveform for reducing transmission of the engine vibration, using output data from the sensor, and obtain a data group of target current values from the target current value waveform in a predetermined sampling cycle; and based on a position of data of a target current value, in the data group of target current values, that is output at a predetermined timing based on a signal from the sensor, adjust a number of data pieces of a data portion having not yet been output of the data group of target current values which are being output so that the number of data pieces comes to correspond to a then cycle length of the engine vibration, and then supply current to the actuator. Accordingly, it is possible to output the number of data pieces included in the data group of target current values after correcting the number of data pieces into a number of data pieces that is appropriate for the cycle length of the engine vibration at the time of supplying current to the actuator. As a result, it is possible to appropriately perform control of the active anti-vibration supporting device.

According to a sixth aspect of the present invention, there is provided a method of controlling anti-vibration for an anti-vibration supporting device, wherein the method repeats, as cycles: a read process for reading output values that are in one cycle out of repeated vibration cycles of an engine, during the one cycle from a sensor for detecting rotation variation of the engine; a computation process for computing, in a first next cycle, a target current value waveform for supplying current to an anti-vibration actuator based on the output values from the sensor having been read in the cycle previous to the first next cycle; and an output process for outputting, in a second next cycle next to the first next cycle, a current that corresponds to the target current value waveform computed in the cycle previous to the second next cycle, to the actuator to reduce the engine vibration, wherein, the computation process obtains a data group of target current values from the computed target current value waveform in a predetermined sampling cycle; and the output process, in outputting a current that corresponds to the target current value waveform in the output process in each respective cycle, detects a certain time defined by a then present rotation speed of the engine, the detection being based on acceleration/deceleration of the rotation speed of the engine, and performs a target-current-value-waveform-length adjustment process for adjusting a number of data pieces of target current values so that the number of data pieces comes to correspond to a cycle length of a then present cycle of the engine vibration.

According to the sixth aspect, an anti-vibration supporting device, in outputting a current that corresponds to a target current value waveform in output processing in each cycle of vibration cycles of an engine, detects a certain time defined by a then present rotation speed of the engine, the detection being based on acceleration/deceleration of the rotation speed of the engine, and adjusts a number of data pieces of target current values so that the number of data pieces comes to correspond to a cycle length of the then present cycle of the engine vibration. As a result, the number of data pieces of target current values is adjusted to match with the rotation variation of the engine. Accordingly, it is possible to appropriately perform control of the active anti-vibration supporting device.

ADVANTAGE OF THE INVENTION

According to the present invention, it is possible to provide an active anti-vibration supporting device and a method of anti-vibration control with the same, which enables an anti-vibration function against engine vibration without stopping current supply to an actuator.

BRIEF DESCRIPTION OF THE DRAWINGS

FIG. 13 is an illustration of a method, in the case that the rotation speed of the engine is accelerated, of correcting the data group of target current values Fr_ICMD related to the target current value waveform on Fr side, the correction being performed by a driving-pulse-control-signal output-time correction section, wherein diagram (a) illustrates data of the target current values Fr_ICMD on Fr side, in a number of $N1_F$ of data pieces, generated corresponding to the cycle length T1 of the first cycle C1 of the engine vibration and a current peak position $NC_F$; diagram (b) illustrates specifying data in a number of $\Delta N_F$ of data pieces around the current peak position $NC_F$ in order not to output the data so that the number of data pieces becomes $N2_F$ that corresponds to the estimated cycle length T3' of the third cycle C3 of the engine vibration; and diagram (c) illustrates the target current values Fr_ICMD that are output, jumping over the data in the number of $\Delta N_F$ of data pieces around the current peak position $NC_F$;

EMBODIMENT FOR CARRYING OUT THE INVENTION

Figure 1:
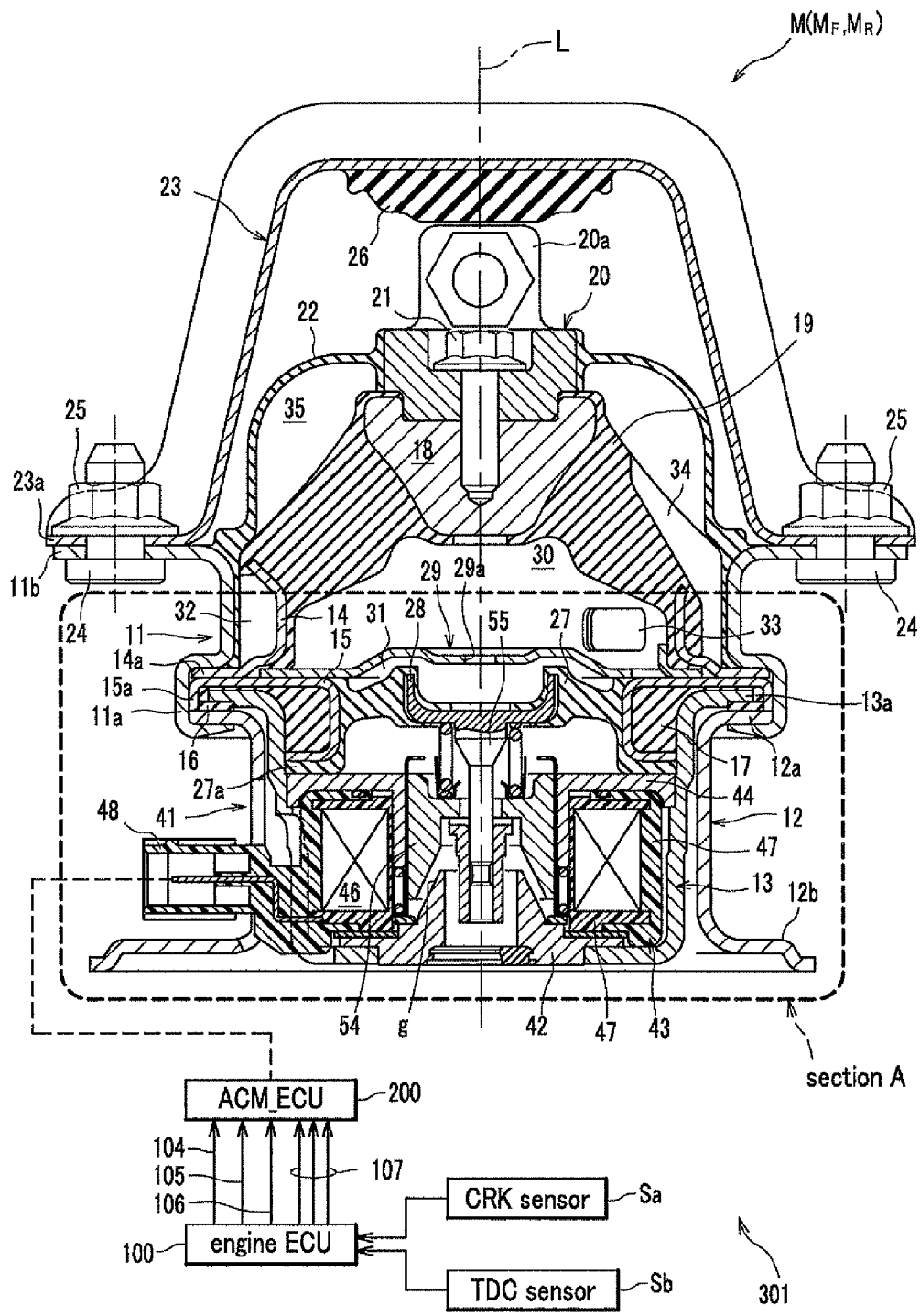
FIG. 1 is a vertical cross-sectional view showing the structure of an active control mount of an active anti-vibration supporting device according to an embodiment.
Figure 2:
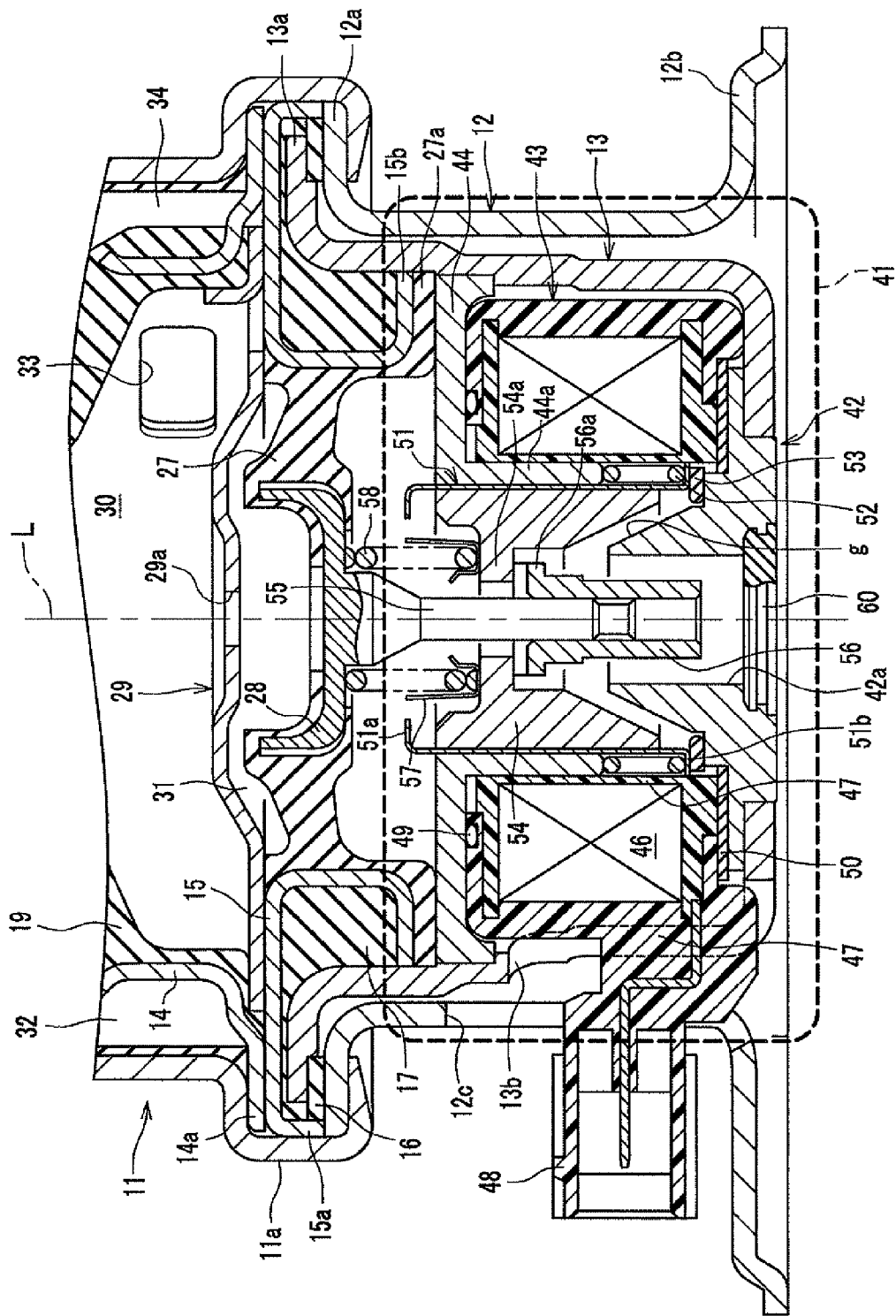
FIG. 2 is an enlarged view of section A in FIG. 1.

An embodiment of the present invention will be described below in detail, referring to the drawings, as appropriate.
Overall Structure of Active Anti-vibration Supporting Device FIG. 1 is a vertical cross-sectional view showing the structure of an active control mount of an active anti-vibration supporting device according to the present embodiment. FIG. 2 is an enlarged view of section A in FIG. 1.

An active anti-vibration supporting device 301 according to the present embodiment has active control mounts $M_F$, $M_R$ which can be driven expandingly/contractingly in the vertical direction and arranged in a number of two on the front side and the rear side of the engine of a vehicle to be used for elastically supporting the engine on a vehicle frame.

In the description below, the active control mounts $M_F$, $M_R$ will be referred to as merely as an active control mount M in a case that it is not particularly necessary to distinguish the two.

Herein, the engine is a so-called laterally mounted V-6 cylinder engine, for example, an engine in which a transmission is connected to an end of a crankshaft (not shown) and the crankshaft is laterally arranged with respect to the body of a vehicle. Accordingly, the engine is disposed such that the crankshaft thereof is along the lateral direction with respect to the vehicle. Herein, the active control mount $M_F$ is provided on the front side of the vehicle and the active control mount $M_R$ is provided on the rear side of the vehicle, and these active control mounts are arranged in a pair with the engine therebetween in order to reduce vibration in the roll direction caused by the engine.

The active control mounts $M_F$, $M_R$ are fitted at positions lower than the center of gravity of the engine to reduce roll vibration in the front/rear direction of the engine and elastically support the engine with respect to the body of the vehicle.

As shown in FIG. 1, the active anti-vibration supporting device 301 is provided with an active control mount control unit ECU 200 for controlling active control mounts M, M (FIG. 1 shows only one representative active control mount M.) In the description below, the active control mount control unit ECU 200 will be referred to as 'ACM_ECU 200'.

ACM_ECU 200 is connected through CAN communication or the like with an engine control unit ECU (hereinafter, referred to as 'engine ECU') 100 for controlling the engine rotation speed Ne, the output torque, and the like. Herein, ACM_ECU 200 corresponds to 'control unit' described in claims.
Structure of ACM As shown in FIG. 1, an active control mount M has a structure that is substantially axial-symmetric with respect to axis line L, and constructed with an upper housing 11 substantially in a cylindrical shape, a lower housing 12 substantially in a cylindrical shape and arranged below the upper housing 11, an actuator casing 13 that is substantially in a cup shape with an open top surface and is housed in the lower housing 12, a diaphragm 22 connected to the upper side of the upper housing 11, a first-elastic-member support ring 14 in an annular shape stored in the upper housing 11, a first elastic member 19 connected to the upper side of the first-elastic-member support ring 14, a second-elastic-member support ring 15 in an annular shape housed in the actuator casing 13, a second elastic member 27 connected to the inner circumferential side of the second-elastic-member support ring 15, an actuation section (actuator) 41 that is housed in the actuator casing 13 and disposed below the second-elastic-member support ring 15 and the second elastic member 27, and the like.

Between a flange section 11a at the lower end of the upper housing 11 and a flange section 12a at the upper end of the lower housing 12, a flange section 13a at the outer circumference of the actuator casing 13, an outer circumferential portion 14a of the first-elastic-member support ring 14, and an upper-outer-circumferential portion 15a of the second-elastic-member support ring 15 are superimposed and joined by press-fitting. Herein, a first floating rubber 16 in an annular shape is arranged between the flange section 12a and the flange section 13a, and a second floating rubber 17 in an annular shape is arranged between the upper surface of the flange section 13a and the lower surface of the upper-outer-circumferential portion 15a of the second-elastic-member support ring 15. Thus, the actuator casing 13 is floating-supported, movably relative to the upper housing 11 and the lower housing 12 in the vertical direction.

The first-elastic-member support ring 14 and a first-elastic-member support boss 18 arranged inside a recession provided on the upper side of the first elastic member 19 are joined by vulcanizing adhesion at the lower end and the upper end of the first elastic member 19 formed of rubber with a large thickness. Further, a diaphragm support boss 20 is fixed on the upper surface of the first-elastic-member support boss 18 with a bolt 21. The outer circumferential portion of the diaphragm 22 whose inner circumferential portion is joined with the diaphragm support boss 20 by vulcanizing adhesion is joined with the upper housing 11 by vulcanizing adhesion.

An engine fitting section 20a is integrally formed on the upper surface of the diaphragm support boss 20 and is fixed to the engine (The details of a method of fixing are not shown.). Further, a vehicle body fitting section 12b at the lower end of the lower housing 12 is fixed to a vehicle frame, not shown.

A flange section 11b at the upper end of the upper housing 11 is joined with a flange section 23a at the lower end of a stopper member 23 by a bolt 24 and a nut 25. The engine fitting section 20a projecting from the upper surface of the diaphragm support boss 20 contactably faces a stop rubber 26 fitted to the upper-inner surface of a stopper member 23.

With such a structure, when a heavy load is input from the engine to the active control mount M, the engine fitting section 20a comes in contact with the stop rubber 26, and an excessive displacement of the engine is thereby reduced.

The inner circumferential surface of the second-elastic-member support ring 15 is joined with the outer circumferential portion of the second elastic member 27 formed of rubber in a membrane form by vulcanizing adhesion, and a movable member 28 is joined with the central portion of the second elastic member 27 such that the upper portion thereof is embedded.

A partition wall member 29 in a disc shape is fixed between the upper surface of the second-elastic-member support ring 15 and the lower portion of the first-elastic-member support ring 14. A first liquid chamber 30 partitioned by the first-elastic-member support ring 14, the first elastic member 19, and the partition wall member 29, and a second liquid chamber 31 partitioned by the partition wall member 29 and the second elastic member 27, communicate with each other through a communication hole 29a of the partition wall member 29, the communication hole 29a being open at the central portion of the partition wall member 29.

The outer circumferential portion 27a of the second elastic member 27 is sandwiched between the lower-surface outer circumferential portion 15b (refer to FIG. 2) of the second-elastic-member support ring 15 and a later-described yoke 44 to have a sealing function.

Further, an annular communication path 32 is formed between the first-elastic-member support ring 14 and the upper housing 11. The communication path 32 communicates with the first liquid chamber 30 through a communication hole 33, and communicates, through an annular communication gap 34, with a third liquid chamber 35 partitioned by the first elastic member 19 and the diaphragm 22.

As shown in FIG. 2, a coil assembly 43 is arranged between a fixed core 42 and the yoke 44, and is constructed with a coil 46 and a coil cover 47 covering the coil 46. The coil cover 47 is integrally formed with a connector 48 extending outside through openings 12c, 13b of the lower housing 12 and the actuator casing 13. An electricity supply wire for supplying electricity to the coil 46 is connected to the connector 48.

On the upper surface side of the coil cover 47, the yoke 44 has an annular recession-turnback portion with a recession and a cylindrical portion 44a extending downward from the inner circumference of the recession-turnback portion. In other words, the yoke 44 has a cylindrical shape with a flange. Between the upper surface of the coil cover 47 and the lower surface of the recession-turnback portion of the yoke 44, a sealing member 49 is arranged. Between the lower surface of the coil cover 47 and the upper surface of the fixed core 42, a sealing member 50 is arranged. With these sealing members 49, 50, it is possible to prevent that water and dusts come into the inner space of the actuation section 41 from the openings 12c, 13b of the lower housing 12 and the actuator casing 13.

With the inner circumferential portion of the yoke 44, a shaft receiving member 51 in a thin cylindrical shape is engaged slidably in the vertical direction. At the upper end of the shaft receiving member 51, formed is an upper flange 51a that is bent radially inward. At the lower end of the shaft receiving member 51, formed is a lower flange 51b that is bent radially outward.

Between the lower flange 51b and the lower end of the cylindrical portion 44a of the yoke 44, a set spring 52 is arranged in a state being pressed. The elastic force of the set spring 52 urges the lower flange 51b of the shaft receiving member 51 downward to thereby press the lower flange 51b of the shaft receiving member 51 against the upper surface of the fixed core 42 through an elastic member 53 arranged between the lower surface of the lower flange 51b and the fixed core 42. Thus, the shaft receiving member 51 is supported by the yoke 44.

A movable core 54 substantially in a cylindrical shape is engaged with the inner circumferential surface of the shaft receiving member 51 slidably in the vertical direction. Further, the fixed core 42 and the movable core 54 are hollow at the respective central portions on axis line L. Through the hollows, penetrated is a rod 55 that is connected with the central portion (on axial line L) of the above-described movable member 28 and is substantially in a cylindrical shape extending downward. A nut 56 is engaged with the lower end of the rod 55. The nut 56 has, at the central portion thereof, a hollow portion with an open upper end, and the lower end portion of the rod 55 is received by the hollow portion. The upper end portion 56a of the nut 56 has a diameter that is a little larger than the portion lower than the upper end portion 56a. The upper surface of the upper end portion 56a comes in contact with the lower surface of the spring seat 54a of the movable core 54.

Further, between the spring seat 54a of the movable core 54 and the lower surface of the movable member 28, a set spring 58 is arranged in a state of being pressed. The elastic force of the set spring 58 urges the movable core 54 downward to thereby press the lower surface of the spring seat 54a of the movable core 54 against the upper surface of the upper end 56a of the nut 56 to fix the movable core 54. In this state, the conical inner circumferential surface of the cylindrical portion of the movable core 54 and the conical outer circumferential surface of the fixed core 42 face each other through a gap g with conical surfaces.

In an opening 42a formed at the center of the fixed core 42, the nut 56 is engaged with the rod 55 in a state of being adjusted with respect to the vertical position, wherein the opening 42a is sealed by a rubber cap 60.

Action of Active Control Mount

The coil 46 of the actuation section 41 is magnetically excited by electricity supply control from ACM_ECU 200 to draw the movable core 54 and thereby move the movable member 28 downward. Accompanying this movement of the movable member 28, the second elastic member 27 that partitions the second liquid chamber 31 is deformed downward to increase the inner volume of the second liquid chamber 31. In reverse, if the coil 46 is demagnetized, the second elastic member 27 is deformed upward due to the elasticity thereof to raise the movable member 28 and the movable core 54 and thereby decreases the inner volume of the second liquid chamber 31.

However, during moving of a vehicle, in a coupled system of an engine, a vehicle body, and a suspension with a low frequency (for example, 7 to 20 Hz), when engine shake vibration is caused, the engine shake vibration being low frequency vibration caused by resonance between rigid-body vibration of the vehicle and the engine system, if the first elastic member 19 is deformed by a load that is input from the engine through the diaphragm support boss 20 and the first-elastic-member support boss 18, and the inner volume of the first liquid chamber 30 is thereby changed, liquid flows between the first liquid chamber 30 and the third liquid chamber 35 which are connected with each other by the communication path 32.

In this state, when the inner volume of the first liquid chamber 30 becomes larger or smaller, the inner volume of the third liquid chamber 35 correspondingly becomes smaller or larger, however, the change in the inner volume of the third liquid chamber 35 is absorbed by the elastic deformation of the diaphragm 22. Herein, the shape and dimensions of the communication path 32 and the constant of spring of the first elastic member 19 are set such that a low constant of spring and a high damping force are attained in a frequency region of the above-described engine shake vibration. Thus, vibration transmitted from the engine to the vehicle frame can be effectively reduced.

Incidentally, in the frequency region of the above-described engine shake vibration, in a case that the engine is in a state of steady rotation, the actuation section 41 is maintained in a non-operational state where the actuation section 41 is not driven.

In a case that vibration with a frequency higher than that of the engine shake vibration, in other words, vibration caused by the rotation of the crankshaft, not shown, of the engine during idling, or vibration during cylinder-stopped operation where the engine is driven with a part of cylinders of the engine being stopped, has occurred, liquid in the communication path 32 connecting the first liquid chamber 30 and the third liquid chamber 35 becomes into a stick state and unable to provide an anti-vibration function. Therefore, the actuation sections 41, 41 of the active control mounts $M_F$, $M_R$ are driven in order to provide the anti-vibration function.

Incidentally, idle vibration causes low frequency vibration of a floor, a sheet, and a steering wheel in an idle rotation state, wherein fast vibration has a frequency of, for example, 20 to 35 Hz in a case of a 4-cylinder engine and 30 to 50 Hz in a case of a 6-cylinder engine, while slow vibration occurs with a frequency 5 to 10 Hz due to non-uniform combustion principally caused by roll vibration of the engine.

In this situation, in order to drive the actuation sections 41, 41, on the active anti-vibration supporting device 301 including the active control mounts $M_F$, $M_R$, shown in FIG. 1, based on a crank pulse sensor (a sensor for detecting variation in rotation of the engine) Sa (represented by 'CRK sensor Sa' in FIG. 1, and hereinafter referred to as 'CRK sensor Sa') and a TDC sensor (a sensor for detecting variation in rotation of the engine) Sb, a target current value waveform is computed by a microcomputer 200b (refer to FIG. 3) of ACM_ECU 200. Then, target current values (a target current) for PWM (Pulse Width Modulation) control, which are sampled from the target current value waveform having been computed above, are output from the microcomputer 200b to drive circuits 121A, 121B (refer to FIG. 3). Thus, currents applied to coils 46, 46 are controlled.

In the actuation section 41 of an active control mount M, structured as shown in FIG. 2, when current is not applied to the coil 46, the movable member 28 moves up by the elastic restoring force of the second elastic member 27. Then, the nut 56 pushes the movable core 54 upward to form the gap g between the movable core 54 and the fixed core 42.

On the other hand, when a current is applied from ACM_ECU 200 to the coil 46, lines of magnetic flux generated by the coil 46 form a closed circuit that vertically penetrates through the yoke 44, the movable core 54, and the gap g and returns to the fixed core 42 and the coil 46. The movable core 54 is thereby drawn and moved downward. Herein, the movable core 54 moves the movable member 28 downward through the nut 56 that is fixed to the rod 55 connected with the lower portion of the movable member 28, and the second elastic member 27 is thereby deformed downward. As a result, as the inner volume of the second liquid chamber 31 (refer to FIG. 1) increases, liquid in the first liquid chamber 30, which has been pressed and shrunk by a pressing load from the engine (refer to FIG. 1), passes the communication hole 29a of the partition wall member 29 and flows into the second liquid chamber 31. A load transmitted from the engine to the vehicle can thereby be reduced.

In contrast, when the current applied to the coil 46 is stopped, the movable core 54 is released from the downward drawing force, and the second elastic member 27 having been downward deformed returns toward the upper position by the elastic force thereof. The movable core 54 is accordingly drawn and moved upward through the nut 56 fixed to the rod 55. As a result, the gap g is formed. Herein, as a result of upward movement of the second elastic member 27, the inner volume of the second liquid chamber 31 decreases. Accordingly, liquid in the second liquid chamber 31 flows through the communication hole 29a of the partition wall member 29 into the first liquid chamber 30 having been depressurized by a drawing load from the engine. Thus, a load transmitted from the engine to the vehicle can thereby be reduced.

By controlling the current value to be applied to the coil 46 in such a manner, ACM_ECU 200 can control the vertical movement of the movable member 28 and thereby perform the anti-vibration function not to transmit the roll vibration of the engine to the vehicle frame.

The functional structure of engine ECU 100 and ACM_ECU 200 will be described below in detail.

Configuration of Engine ECU

Figure 3:
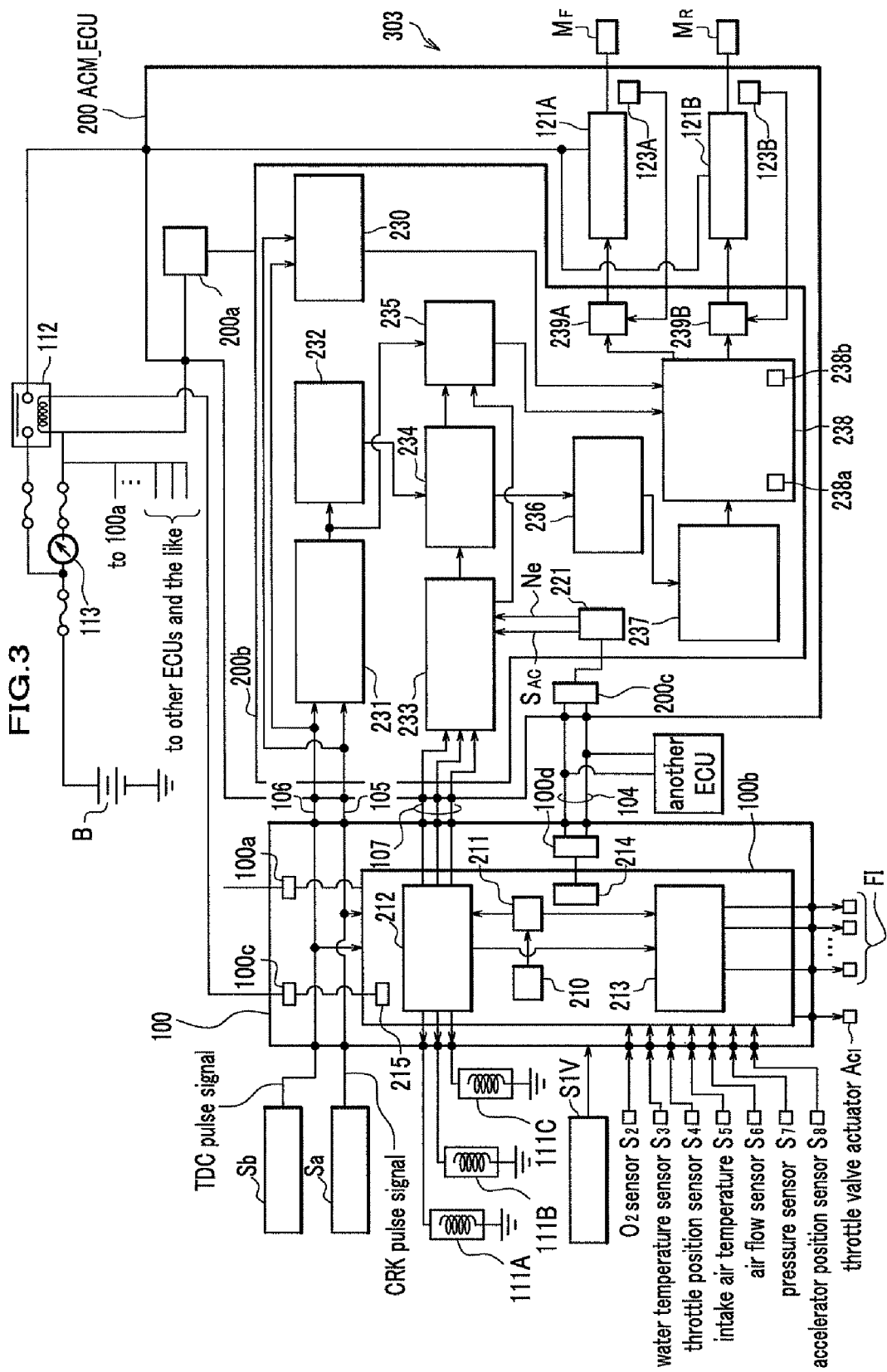
FIG. 3 is a function block diagram showing the configuration of the active anti-vibration supporting device.

Referring to FIG. 3, and also referring to FIGS. 1 and 2 as appropriate, the configuration of engine ECU will be described below.

FIG. 3 is a function block diagram showing the configuration of the active anti-vibration supporting device.

Engine ECU 100 includes an ECU power supply circuit 100a, a microcomputer 100b, a ROM (not shown), an interface circuit for signal connection from various sensors, an drive circuit (not shown) for actuating cylinder stop solenoids 111A, 111B, and 111C, a relay switch 100c for turning on an ACM power supply switch 112, and various interface circuits, such as a CAN communication section 100d.

Engine ECU 100 is connected with ACM_ECU 200 by a crank pulse signal line 105, a TDC pulse signal line 106, and cylinder stop signal lines 107, which are dedicated signal lines between Engine ECU 100 and ACM_ECU 200. Further, engine ECU 100 is connected through a bus type CAN communication line 104 with ACM_ECU 200 and other ECUs, for example, an electrical power steering ECU for assist control of the steering torque with a reinforcing force by an electric motor.

The microcomputer 100b includes an engine rotation speed computation section 210, a required output computation section 211, a number-of-cylinders switching determination section 212, a fuel injection control section 213, and an engine control parameter transmission/reception section 214, which are function sections implemented by execution of programs stored in the ROM.

Based on signals from the CRK sensor Sa and the TDC sensor Sb, the engine rotation speed computation section 210 computes an engine rotation speed Ne and outputs it to the 211.

Based mainly on a signal from an acceleration position sensor $S_8$ for detecting a pressing amount of the acceleration pedal, a signal from a vehicle speed sensor S1V for detecting a vehicle speed, and the engine rotation speed Ne computed by the engine rotation speed computation section 210, the required output computation section 211 performs estimation of a deceleration stage, estimation of a current engine output torque, computation of a required torque, computation of an air intake amount corresponding to the required torque, control of a throttle valve actuator $A_{c1}$, and the like.

In computing the air intake amount corresponding to the required torque by the required output computation section 211, used are, for example, the temperature of cooling water for engine from a water temperature sensor $S_3$, a throttle opening degree from a throttle position sensor $S_4$, an air intake temperature from an air intake temperature sensor $S_5$, an air intake flow rate from an air flow sensor $S_6$, an air intake pressure from a pressure sensor $S_7$, and the like.

Using, for example, the rotation speed of the engine, the vehicle speed, and the current estimated torque and the required torque having been computed by the required output computation section 211, the number-of-cylinders switching determination section 212 determines an idling state and a cruising state with a small output torque. When the number-of-cylinders switching determination section 212 has determined such an operation state of the engine, the number-of-cylinders switching determination section 212, based on a number-of-cylinders determination map (not shown) with parameters of a rotation speed of the engine, a required torque, and the like which have been set in advance, switches the number of cylinders in operation state, makes one or two of the cylinder stop solenoids 111A, 111B, and 111C, which operate a hydraulic actuator (not shown) of a valve stop mechanism, be in a current applied state, so as to perform switching control to a cylinder stop state with 4 cylinder operation or 3 cylinder operation.

For example, when current is applied to the actuating cylinder stop solenoid 111A, the three cylinders #1, #2, and #3 out of the six cylinders turns into a cylinder stop state, and when current is applied to the actuating cylinder stop solenoid 111B, the cylinder #3 turns into a cylinder stop state, and when current is applied to the actuating cylinder stop solenoid 111C, the cylinder #4 turns into a cylinder stop state. Accordingly, the actuating cylinder stop solenoids 111B, 111C are made be in a current applied state in a case of 4 cylinder operation, and only the actuating cylinder stop solenoids 111A is made be in a current applied state in a case of 3 cylinder operation.

Further, when the number-of-cylinders switching determination section 212 has applied a cylinder stop state, the number-of-cylinders switching determination section 212 outputs cylinder stop signals which indicates cylinders of cylinder stop objects through the cylinder stop signal lines 107 to a later-described engine rotation mode determination section 233 of ACM_ECU 200.

Corresponding to the required torque computed by the required output computation section 211 and the rotation speed of the engine, the fuel injection control section 213 sets a fuel injection amount, concretely a fuel injection time period. Further, based on an injection start timing map (not shown), which is set in advance corresponding to the timings of pulse signals from the CRK sensor Sa and the TDC sensor Sb and rotation speeds of the engine, the fuel injection control section 213 performs control of fuel injection on injectors FI of cylinders in an operation state.

Based on a signal of the oxygen concentration in emission gas from an $O_2$ sensor $S_2$, the fuel injection control section 213 adjusts the fuel injection amount to attain a combustion state complying with gas emission regulations.

Incidentally, engine ECU 100 is provided with an engine control parameter transmission/reception section 214. The engine control parameter transmission/reception section 214 outputs parameters, such as a rotation speed of the engine, a vehicle speed, an estimated output torque of the engine, and the like, which have been obtained by the engine ECU 100, through the bus type CAN communication line 104 to other ECUs, for example, an electric power steering ECU (not shown). The engine control parameter transmission/reception section 214 also detects understeer in acceleration from a vehicle behavior stabilization control system ECU (not shown) to receive an instruction signal for reducing output torque of the engine, and performs the like.

Further, the engine ECU 100 is also provided with an ACM power supply relay signal output section 215. After power is supplied from a battery B to the ECU power supply circuit 100a by turning an ignition switch 113 (hereinafter, referred to as 'IG-SW113') to the position of ignition ON, the microcomputer 100b starts operation, and the ACM power supply relay signal output section 215 operates the relay switch 100c for turning the solenoid of the ACM power supply switch 112 into a current applied state.

As shown in FIG. 3, when IG-SW113 is turned to the position of ignition ON, current is also applied to engine ECU 100 and ACM_ECU 200, then the ACM power supply relay signal output section 215 turns the relay switch 100c into ON state so that the ACM power supply switch 112 turns into a current applied state. As a result, a DC power supply from the battery B is connected to the later-described drive circuits 121A, 121B.

Configuration of ACM_ECU

ACM_ECU 200 will be described below, referring to FIGS. 3 to 5.

ACM_ECU 200 includes an ECU power supply circuit 200a, a microcomputer 200b, a ROM (not shown), the drive circuits 121A, 121B, and current sensors 123A, 123B.

The drive circuits 121A, 121B are constructed with respective switching elements and controlled by drive control sections (current supply control units) 239A, 239B for ON, OFF of PWM control, and thereby controls current values to be supplied to the drive sections 41, 41 (refer to FIG. 1) of the active control mounts $M_F$, $M_R$. The current values supplied from the drive circuits 121A, 121B are detected respectively by the current sensors 123A, 123B, and input to the drive control sections 239A, 239B The microcomputer 200b includes, as shown in FIG. 3, a timing control section 230, a CRK-pulse-read-time temporary storage section 231, a CRK-pulse-interval computation section 232, an engine rotation mode determination section 233, a vibration state estimation section (a vibration state estimation unit) 234, a phase detection section 235, a target current computation section (a target current computation unit) 236, a drive-pulse-control-signal generation section (a target-current-value-group generation unit) 237, a drive-pulse-control-signal output-time correction section (vibration-cycle-during-driving estimation unit, output-time correction unit) 238, and the drive control sections 239A, 239B, which are function sections implemented by execution of programs stored in the ROM.

A crank pulse signal (In FIG. 3, a crank pulse signal is represented by 'CRK pulse signal'.) having been input via the crank pulse signal line 105 is input to the CRK-pulse-read-time temporary storage section 231 and the timing control section 230. A TDC pulse signal having been input from engine ECU 100 via the TDC pulse signal line 106 is input to the CRK-pulse-read-time temporary storage section 231 and the timing control section 230.

Description of Computation Process Cycle

Figure 4:
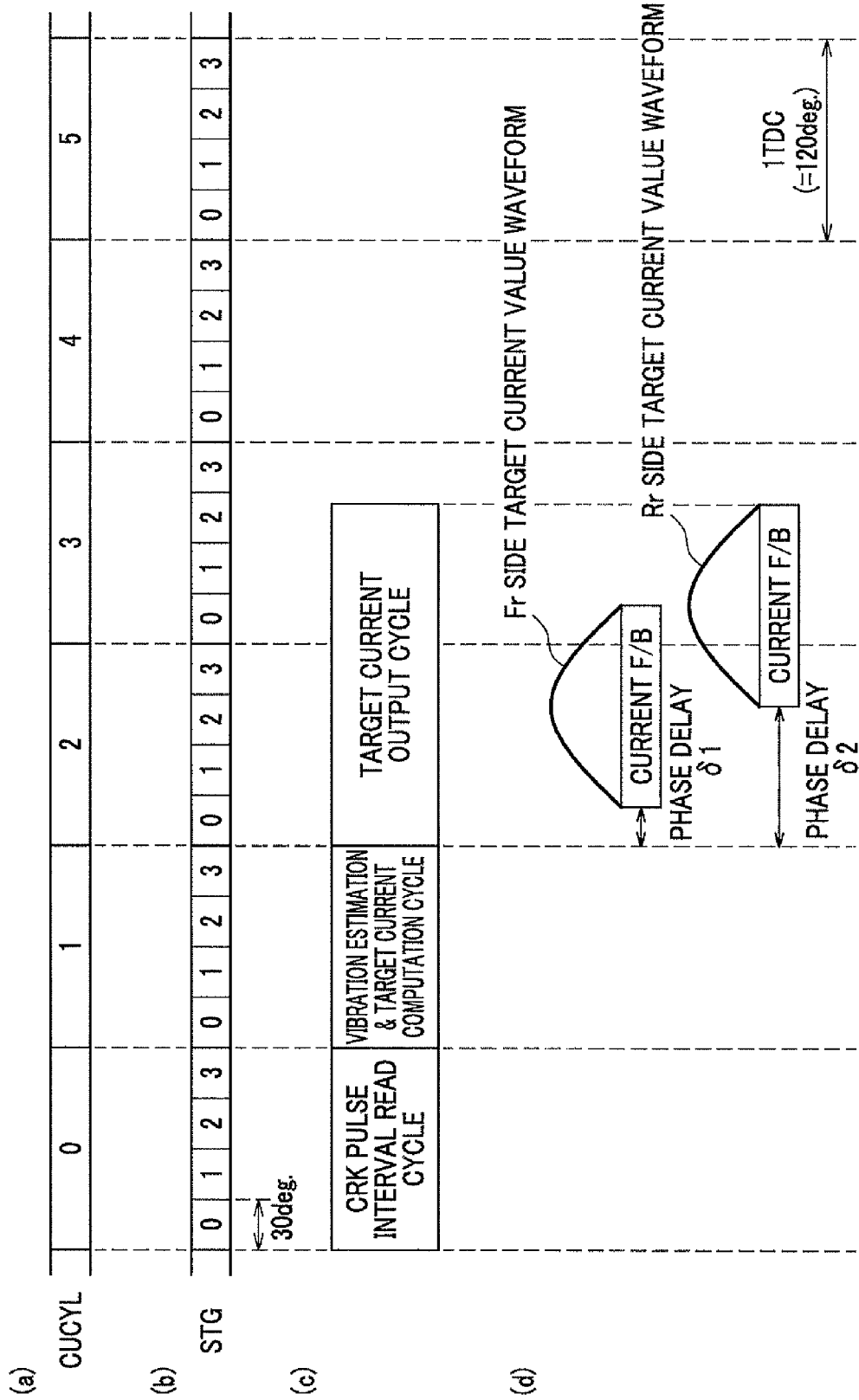
FIG. 4 is an illustration of computation processing cycles of ACM control by a microcomputer of an ACM_ECU, the computation processing cycles being synchronized with TDC pulse signals and crank pulse signals, wherein diagram (a) is a time chart of the computation processing cycles; diagram (b) is a timing chart illustrating a method of dividing each computation processing cycle into four stages STGs, based on the crank pulse signal; diagram (c) is a timing chart illustrating the contents of computation processing in two subsequent computation processing cycles performed on crank pulse signals obtained in the computation processing cycle CUCYL=0 in diagram (a); and diagram (d) is a timing chart illustrating feedback control to a current, corresponding to a target current value waveform having been output.

Referring to FIG. 4, description will be made first on the computation processing cycles of control of the active control mount M (hereinafter, referred to as 'ACM control') by the microcomputer 200b of ACM_ECU 200, wherein the computation processing cycles are synchronized with TDC pulse signals and crank pulse signals.

FIG. 4 is an illustration of computation processing cycles of ACM control of by the microcomputer of ACM_ECU, the computation processing cycles being synchronized with TDC pulse signals and crank pulse signals, wherein diagram (a) is a time chart of the computation processing cycles; diagram (b) is a timing chart illustrating a method of dividing each computation processing cycle into four stages STGs, based on crank pulse signals; diagram (c) is a timing chart illustrating the contents of computation processing in the two subsequent computation processing cycles performed on crank pulse signals obtained in the computation processing cycle CUCYL with the computation processing cycle No. '0' in diagram (a); and diagram (d) is a timing chart illustrating control of feedback to a current, corresponding to a target current value waveform having been output.

Herein, the CRK sensor Sa is a sensor for detecting crank pulses generated by the crankshaft, not shown, of the engine. In the present embodiment, in a case of a 6 cylinder engine, a crank pulse is generated at every six degrees of the crank angle, and the CRK sensor Sa detects and input the each generated crank pulse to engine ECU 100. The TDC sensor Sb is a sensor for output of a TDC pulse signal once at every top dead center of each cylinder, and inputs a TDC pulse signal to engine ECU 100 three times per one rotation of the crankshaft. Each time a TDC pulse signal of each cylinder is input, a computation processing cycle CUCYL (refer to diagram (a) of FIG. 4) of ACM control is updated to a next computation processing cycle CUCYL.

In diagram (a) of FIG. 4, computation processing cycles are represented by 'CUCYL'. Shown are computation processing cycles CUCYL that are later-described 'CRK pulse interval read processing cycles' each of which stores results of measurements of clock pulses by the microcomputer 200b having measured the clock pulses with reference to the point of time of receiving a TDC pulse signal, the measurements being associated with a predetermined number of crank pulse signals, for example, twenty crank pulse signals, namely, in association with respective repeated crank pulse signals of a section of crank angle 120 degrees. In order to identify the respective 'CRK pulse interval read processing cycles' in a series, computation processing cycle Nos. 0 to 5 are assigned. In the below, the process of storing the results measurements on clock pulses in association with the respective crank pulse signals of the sections of crank angle 120 degrees will be referred to as 'a CRK pulse interval read process'.

Each stage is represented by 'STG' in diagram (b) of FIG. 4, and diagram (b) of FIG. 4 shows that the timing control section 230 generates a stage trigger signal at each crank pulse signal for 30 degrees measured with reference to the point of time of receiving a TDC pulse signal, and thereby divides one computation processing cycle CUCYL into four stages STG with assigned stage Nos. 0 to 3. Incidentally, stage trigger signals also include information on stage numbers. A time period corresponding to one stage STG will be referred to as 'STG time' hereinafter. STG time varies, corresponding to the rotation speed of the engine.

Incidentally, in a case that a V-6 engine is operating all of the cylinders, a cycle of engine vibration is a time cycle corresponding to a crank angle of 120 degrees. Description will be made below, taking an example of a case of operation with all the cylinders. In a case that it is experimentally recognized in advance that a cycle of engine vibration is a time period that corresponds to a crank angle of 120 degrees, stages here are set such that a phase delay $\delta 1$ of a later-described target current value waveform (refer to diagram (d) of FIG. 4) at the time of an output with reference to the time of a TDC pulse signal, the target current value waveform being generated to reduce engine vibration, is a little shorter than the time required for rotation of the crankshaft by the crank angle for the first stage with stage No. '0'. Accordingly, without being limited to dividing one computation processing cycle CUCYL into four as described above, the crank angle corresponding to a stage STG may be set to an angle that is a multiple of 6 degrees and is able to divide 120 degrees, for example, 24 degrees (division by five) and 12 degrees (division by ten) such as to divide the computation processing cycle CUCYL into stages in an integer number larger than four.

Diagram (c) of FIG. 4 illustrates the contents of computation processing in the two subsequent computation processing cycles performed on crank pulse signals obtained in the previous computation processing cycle CUCYL with computation processing cycle No. '0' in diagram (a) of FIG. 4. Diagram (c) of FIG. 4 shows that the computation processing cycle CUCYL with a computation processing cycle No. '1', which is performed on the crank pulse signals obtained in the computation processing cycle CUCYL with the computation processing cycle No. '0', is a computation processing cycle (represented by 'ENG vibration estimation computation & target current computation processing cycle' in diagram (c) of FIG. 4) for generating a target current value waveform for estimation computation and for ACM control of engine vibration, later described, and for the like.

Further, diagram (c) of FIG. 4 also shows that the subsequent computation processing cycle CUCYL with the computation processing cycle No. '2', which is performed on the crank pulse signals obtained in the computation processing cycle CUCYL with the computation processing cycle No. '0', is a computation processing cycle (represented by 'target current output processing cycle' in diagram (c) of FIG. 4) for controlling output of the target current value waveform.

Herein, 'target current output processing cycle' corresponds to 'drive timing of the actuator' described in claims.

Hereinafter, a process performed in 'an ENG-vibration-estimation computation & target current computation processing cycle' will be referred to as an 'ENG-vibration-estimation computation & target current computation process', and a process performed in 'a target current output processing cycle' will be referred to as a 'target current output process'.

The upper part of diagram (d) of FIG. 4 shows, regarding a target current output processing cycle, a target current value waveform (represented by 'Fr side target current value waveform' in diagram (d) of FIG. 4) for drive control of the active control mount $M_F$ on the front side, and a phase delay δ1, with deference to the TDC pulse signal, at the time of outputting the target current value waveform. Further, the lower part of diagram (d) of FIG. 4 shows, regarding a target current output processing cycle, a target current value waveform (represented by 'Rr side target current value waveform' in diagram (d) of FIG. 4) for drive control of the active control mount $M_R$ on the rear side, and a phase delay δ2, with deference to the TDC pulse signal, at the time of outputting the target current value waveform.

Incidentally, regarding this target current output processing cycle, feedback control to current, the feedback control being corresponding to the target current value waveform having been output, is performed by the drive control sections 239A, 239B (refer to FIG. 3), as shown represented by 'current F/B' in diagram (d) of FIG. 4.

For the drive control sections 239A, 239B, as respective phase delays δ1 and δ2 exist, the actual target current output processing cycles are extended by the phase delays δ1 and δ2 with reference to the TDC pulse signal. Diagram (c) of FIG. 4 is a schematic illustration, using the length of the 'CRK pulse interval read processing cycle', as described above, wherein the 'ENG-vibration-estimation computation & target current computation processing cycle' is also controlled to perform computation processing in the period of one computation processing cycle CUCYL, however, 'the target current output processing cycle' is controlled, with the phase delays δ1 and δ2 taken into account, exceeding one computation processing cycle CUCYL.

Such control of computation processing cycles CUCYL and of dividing stages STG are performed in the above-described timing control section 230, which will be described later in detail.

Timing Control Section

Returning to FIG. 3, referring to FIG. 3, and referring to FIGS. 1, 4, 11, 13, and 14 as appropriate, the detailed functions of the above-described respective function blocks will be described below.

The timing control section 230 reads crank pulse signals and a TDC pulse signal, as shown in FIG. 3, and based on the TDC pulse signal and the crank pulse signals, the timing control section 230 performs computation of crank pulse counts, updating of a computation processing cycle CUCYL, and generation of stage trigger signals to divide a stage STG.

Then, the timing control section 230 controls the CRK-pulse-reading-time temporary storage section 231 to read measurement results of clock pulses measured by the microcomputer 200b with reference to the point of time of receiving the TDC pulse signal, in association with respective twenty crank pulse signals continuous from the point of time of receiving the TDC pulse signal as a start point, and perform processing of temporary storage, namely the 'CRK pulse interval read processing cycle'.

Following this 'CRK pulse interval read processing cycle', based on the respective temporarily stored measurement results of the clock pulses from the point of time of receiving the TDC pulse signal, the measurements being associated with the crank pulse signals, the timing control section 230 controls the CRK-pulse-interval computation section 232, the engine rotation mode determination section 233, the vibration state estimation section 234, the phase detection section 235, the target current computation section 236, and the drive-pulse-control-signal generation section 237 to perform a process of performing a series of detailed computation processing, namely the 'ENG-vibration-estimation-computation & target current computation process'.

Further, the timing control section 230 controls the drive-pulse-control-signal output-time correction section 238, and the drive control sections 239A, 239B to perform a process of control of output of the target current value waveform, namely the 'target current output process'. Herein, the timing control section 230 transfers and outputs the TDC pulse signal and the crank pulse signals received from engine ECU 100 as they are to the drive-pulse-control-signal output-time correction section 238, and also outputs the stage trigger signals including the information on the stage numbers to be generated at the respective times of measuring the crank pulse signals in the above-described predetermined number (for example, for 30 degrees) with reference to the point of time of receiving the TDC pulse signal.

In such a manner, the timing control section 230 controls one after another of other function sections to perform a pipeline process. That is, during one computation processing cycle CUCYL, (1) when the 'CRK pulse interval read process' is performed by the CRK-pulse-read-time temporary storage section 231, (2) the 'ENG-vibration-estimation computation & target current computation process' is performed by the CRK-pulse-interval computation section 232, the engine rotation mode determination section 233, the vibration state estimation section 234, the phase detection section 235, the target current computation section 236, and the drive-pulse-control-signal generation section 237, and (3) the 'target current output process' is performed by the drive-pulse-control-signal output-time correction section 238 and the drive control sections 239A, 239B. However, the 'target current output process' is performed to be completed, with an excess over one computation processing cycle CUCYL for the time delays by δ1, δ2, as described above.

This series of processing corresponds to 'cycle' described in claims.

CRK-Pulse-Read-Time Temporary Storage Section

The CRK-pulse-read-time temporary storage section 231 is controlled by the timing control section 230 for each 'CRK pulse interval read process' to read the results measurements of clock pulses measured by the microcomputer 200b with reference to the point of time of receiving the TDC pulse signal, in association with respective twenty crank pulse signals continuous from the point of time of receiving the TDC pulse signal as a start point, and perform processing of temporary storage.

CRK-Pulse-Interval Computation Section

The CRK-pulse-interval computation section 232 is controlled by the timing control section 230 to read out the results of measurements of the respective clock pulses temporarily stored in the CRK-pulse-read-time temporary storage section 231, the measurements being associated with the crank pulse signals, and computes the crank pulse interval times to output to the vibration state estimation section 234.

As clock pulses are generated in the microcomputer 200b with a constant cycle, the crank pulse interval times can be easily computed from the results of measurements of the clock pulses.

Vibration State Estimation Section

The vibration state estimation section 234 is controlled by the timing control section 230 to compute nineteen crank angle speeds from the series of crank pulse interval times, which are in a temporal sequence, in correspondence with the crank angle of 6 degrees, and have been computed by the CRK-pulse-interval computation section 232, and computes a series of crank angle accelerations in a temporal sequence from the computed crank angle speeds.

Then, based on the series of crank angle accelerations in a temporal sequence, the vibration state estimation section 234 computes a series of torques in a temporal sequence around the crank shaft of the engine. Assuming that a crank angle acceleration be dω/dt and the inertia moment around the crank shaft of the engine be $I_E$, a torque Tq around the crank shaft of the engine is computed by the following Expression (1).

$$Tq = I_E \times (d\omega/dt) \quad (1)$$

This torque Tq becomes zero with an assumption that the crank shaft is rotating with a constant rotation angle speed ω. However, during an expansion stroke of a cylinder of the engine, the rotation angle speed ω increases with acceleration of the piston, and during a compression stroke, the rotation angle speed ω decreases with deceleration of the piston. Thus, crank angle acceleration dw/dt occurs, and a torque Tq is generated thereby in proportion to the crank angle acceleration dω/dt.

After computing torques Tq, the vibration state estimation section 234 determines the maximum value and the minimum value of the series of torques Tq in a temporal sequence and adjacent to each other in terms of time, and computes the difference between the maximum and the minimum of torques Tq, in other words, computes the amplitude as the amount of variation in torque Tq at the position of the active control mount M that supports the engine.

Herein, if there are plural vibration modes indicated in engine vibration mode information having been input from the engine rotation mode determination section 233, the amplitudes of cycles corresponding to the modes are computed.

The order of vibration mode corresponding to an engine rotation speed Ne is indicated in the engine vibration mode information. Further, the average crank pulse interval can be obtained from the then rotation speed Ne of the engine. Therefore, by determining the maximum value and the minimum value of the series of torques Tq in a temporal sequence, in the cycle with the number of the crank pulses corresponding to the vibration mode of the engine, the variation amount of the torque Tq in a vibration mode with a cycle shorter than the cycle with a crank angle of 120 degrees can be recognized, and the amplitude at the position of the active control mount M supporting the engine can be computed.

The computed amplitudes [the difference between the peak value on the maximum side and the peak value on the minimum side (hereinafter referred to as 'P-P value of torque Tq')] and the timings of peaks of torque Tq for the respective vibration modes of the engine are output to the phase detection section 235 and the target current computation section 236, and a series of torques Tq in a temporal sequence is output to the phase detection section 235.

The vibration state estimation section 234 computes the cycles of engine vibration from the crank pulse intervals computed by the CRK-pulse-interval computation section 232. The cycles of engine vibration refer to intervals between TDC pulse signals, and indicate the time periods for crank angles of every 120 degrees. As crank pulses intervals indicate the time periods for crank angles of every 6 degrees, computation of one cycle of engine vibration means computation of a time period for twenty crank pulse intervals.

Engine Rotation Mode Determination Section

During the period of temporarily storage of the crank pulse signals and the like, as described above, by the CRK-pulse-read-time temporary storage section 231, the engine rotation mode determination section 233 is controlled by the timing control section 230 to determine whether the engine is in a state of operation with all cylinders in operation, in a state of operation with two stopped cylinders, or in a state of operation with three stopped cylinders, further determine an idling state and the like, and output information on engine vibration mode corresponding to determination results to the vibration state estimation section 234 and the phase detection section 235. The determination whether the engine is in a state of operation with all cylinders in operation, in a state of operation with two stopped cylinders, or in a state of operation with three stopped cylinders, and the determination of an idling state and the like, can be performed, based on a signal on stopped cylinders received from the number-of-cylinders switching determination section 212 of the engine ECU 100, a signal on the rotation speed of the engine, a sensor signal on the accelerator position, and the like.

Herein, the information on engine vibration mode refers to information that instructs which mode is the maximum component and which component is the vibration mode to be considered next in restricting the transmission of engine vibration, wherein, having the vibration of the minimum cycle in synchronization with the rotation speed of the engine be the basic mode, higher order mode components such as the 2nd order mode are also in consideration.

The information on engine vibration mode is stored in advance in the ROM in a form of map with parameters of operation state, that are the state of operation with all cylinders in operation, the state of operation with two stopped cylinders, and the state of operation with three stopped cylinders, and the rotation speed of the engine.

Incidentally, in a case of a V-6 engine, as explosion occurs three times in cylinders during one rotation of the crank shaft, the vibration of the basic mode corresponding to the rotation speed of the engine will be referred to as 'the 3rd order engine vibration'. The vibration frequency of the 3rd order engine vibration increases as the rotation speed of the engine increases.

In a case of a serial 4 cylinder engine, as explosion occurs twice in cylinders during one rotation of the crack shaft, the vibration of the basic mode corresponding to the rotation speed of the engine will be referred to as 'the 2nd order engine vibration'. In a driving state with three cylinders of a V-6 engine, in other words, in a case of operation with stopped cylinders, as explosions occur 1.5 times during one rotation, the vibration of the basic mode corresponding to the rotation speed of the engine will be referred to as 'the 1.5th order engine vibration'.

As described above, in the description of the operation in the present embodiment will be made, taking an example of operation with all cylinders, detailed description of ACM control of engine vibration in a case of operation with stopped cylinders will be omitted.

Phase Detection Section

Figure 11:
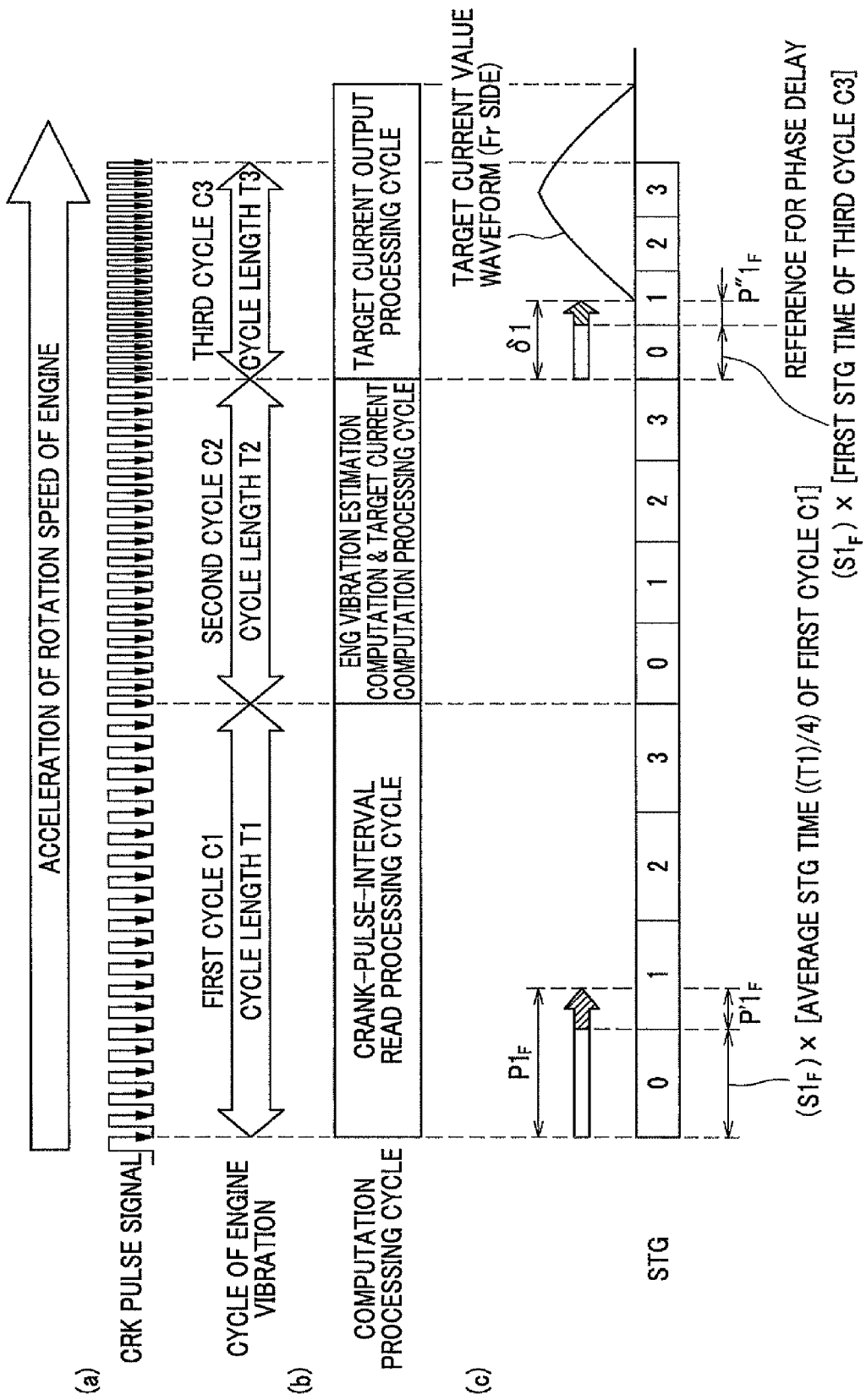
FIG. 11 is an illustration of a case that the rotation speed of the engine is accelerated, showing a phase delay $P1_F$ computed based on crank pulse signals obtained in a crank-pulse-interval read processing cycle, an adjustment process of the phase delay in a target current output processing cycle, and a correction process of a data group of target current values at the time of outputting a target current value waveform, wherein diagram (a) illustrates the correspondence relationship between the time chart of the crank pulse signals and the cycles of engine vibration; diagram (b) is a time chart of computation processing cycles; and diagram (c) illustrates an adjustment process of a phase delay at the time of outputting a target current value waveform on Fr side, and an adjustment process of the length of the target current value waveform.

Based on the P-P value of toque Tq from the vibration state estimation section 234, the timing of a peak of torque Tq, the series of torques Tq in a temporal sequence, the crank pulse signals having been read out from the CRK-pulse-read-time temporary storage section 231, and the results of measurements of the clock pulses of each cylinder measured from the point of time of receiving the TDC pulse signal as a start point, the measurements being associated with the crank pulse signals, the phase detection section 235 compares the timing of the peak of torque Tq and the timing of TDC, and thereby computes the time-based phase delay $P1_F$ (refer to FIG. 11)

for ACM control of the active control mount $M_F$ on the front side. Hereinafter, the phase delay $P1_F$ will be referred to as 'phase delay on Fr side'.

Further, the phase detection section 235 divides the computed phase delay $P1_F$ by an average STG time (=(T1)/4) (refer to FIG. 11) for one cycle of engine vibration computed by the vibration state estimation section 234 to compute the quotient $S1_F$ (refer to FIG. 11) and the time remainder $P'1_F$ (refer to FIG. 11). The computed quotient $S1_F$ is the number of stages STG (hereinafter, referred to as 'the number of STGs').

Herein, T1 refers to the length of the cycle of engine vibration in 'the CRK pulse interval read process' and represents the cycle of the later-described first cycle (the first vibration cycle) C1 (refer to FIG. 11) of engine vibration. Further, the average STG time ((T1/4) is the average time required for rotation of the crankshaft by a crank angle of 30 degrees in the CRK pulse interval read process cycle'.

Further, the phase detection section 235 adds the computed phase delay $P1_F$ and $\delta 0$ (refer to (b) of FIG. 5) that is a half of the above-described length T1 of the cycle, which is the phase difference between the active control mounts $M_F$ and $M_R$ on the front and rear sides, and thus computes a phase delay $P1_R$ of the active control mount $M_R$ (hereinafter, referred to as 'Rr side phase delay'). Similarly to the phase delay $P1_F$ on Fr side, the phase detection section 235 also divides the computed phase delay $P1_R$ on Rr side by the average STG time (=(T1)/4) for one cycle of engine vibration computed by the vibration state estimation section 234 to compute the quotient $S1_R$ and the time remainder $P'1_R$.

The phase detection section 235 inputs the computed two pairs of data (the number of STGs $S1_F$ and the time remainder $P'1_F$) and (the number of STGs $S1_R$ and the time remainder $P'1_F$), which have been respectively computed with respect to Fr side and Rr side, to the drive-pulse-control-signal output-time correction section 238.

Target Current Computation Section

Based on the amplitude at the position of the active control mount M for the engine vibration mode designated by the engine rotation mode determination section 233 and input from the vibration state estimation section 234, the target current computation section 236 computes a target current value waveform for the active control mount M, wherein this computation of a target current value waveform is performed for each of the front and rear active control mounts $M_F$ and $M_R$.

Herein, a plurality of patterns of target current value waveforms is stored in advance in the ROM, in association with vibration mode information that the engine rotation mode determination section 233 outputs, and the patterns of specific target current value waveforms are selected, referring to the vibration mode information. Based on the selection, the gains of the current value waveforms corresponding to the amplitudes of the respective vibration modes are set respectively and combined to set one current value waveform. The length of a current value waveform is set to a length of time that is the same as the cycle length T1 of engine vibration having been computed by the vibration state estimation section 234.

Figure 5:
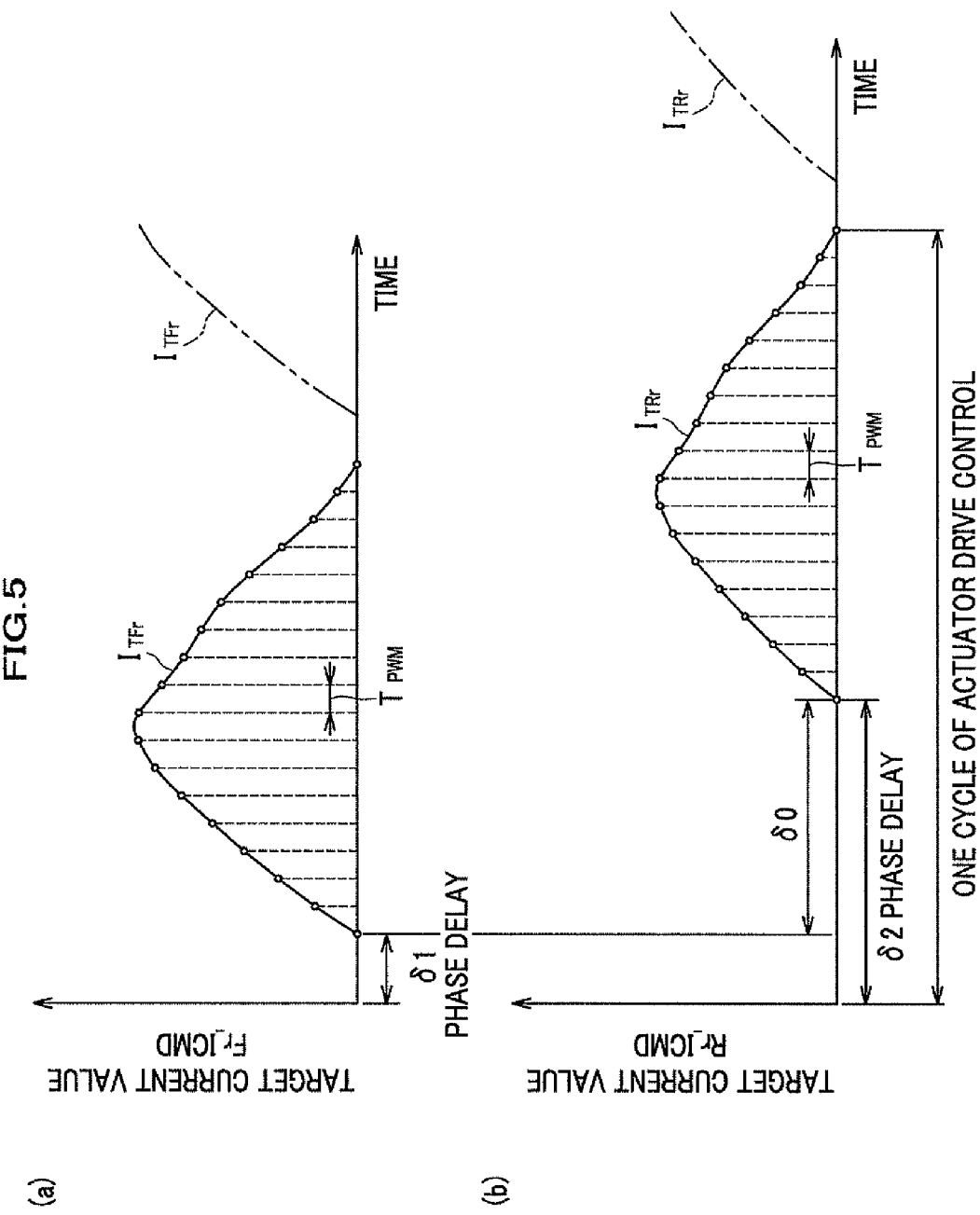
FIG. 5 shows examples of target current value waveforms for active control mounts $M_F$, $M_R$ at driving timings of the actuator, wherein diagram (a) is an illustration of a target current value waveform $I_{TFr}$ for the active control mount $M_F$; and diagram (b) is an illustration of a target current value waveform $I_{TRr}$ for the active control mount $M_R$.

FIG. 5 shows examples of target current value waveforms for active control mounts $M_F$, $M_R$ at driving timings of the actuator, wherein diagram (a) is an illustration of a target current value waveform $I_{TFr}$ for the active control mount $M_F$, and diagram (b) is an illustration of a target current value waveform $I_{TRr}$ for the active control mount $M_R$. Herein, the vertical axis of diagram (a) of FIG. 5 represents target current values Fr_ICMD for ACM control of the active control mount $M_F$, and the horizontal axis represents time. Likewise, the vertical axis of diagram (b) of FIG. 5 represents target current values Rr_ICMD for ACM control of the active control mount $M_R$, and the horizontal axis represents time.

Phase delays $\delta 1$, $\delta 2$ in diagrams (a) and (b) of FIG. 5 are phase delays at the time of actual control of the active control mounts $M_F$ and $M_R$ of the active control mounts $M_F$ and $M_R$, wherein the phase delays $\delta 1$, $\delta 2$ are set by the drive-pulse-control-signal output-time correction section 238.

A target current value waveform $I_{TFr}$ for the active control mount $M_F$ and a target current value waveform $I_{TRr}$ for the active control mount $M_R$ generated by the target current computation section 236 are in general different target current value waveforms. The target current computation section 236 sets only two target current value waveforms $I_{TFr}$, $I_{TRr}$ for the active control mounts $M_F$, $M_R$. The target current value waveforms $I_{TFr}$, $I_{TRr}$ shown by alternate long and two short dashed curves represent the target current value waveforms $I_{TFr}$, $I_{TRr}$ that are set by the target current computation section 236 in the next computation processing cycle.

Drive-Pulse-Control-Signal Generation Section

The drive-pulse-control-signal generation section 237 will be described below, referring to FIGS. 3 to 5. The drive-pulse-control-signal generation section 237 samples the target current value waveforms $I_{TFr}$, $I_{TRr}$, which have been set by the target current computation section 236, at a constant cycle length $T_{PWM}$, for example at periodic interval of 500 μsec, with which target currents are actually PWM-controlled by the drive control section 239A, drive circuit 121A, the drive control section 239B, and the drive circuit 121B, which are on the side of ACM_ECU 200 and will be described later. The drive-pulse-control-signal generation section 237 thereby sets a data group of target current values Fr_ICMD for PWN control of the active control mount $M_F$ and a data group of target current values Rr_ICMD for PWN control of the active control mount $M_R$.

Herein, sampling at a constant cycle length of $T_{PWM}$ and setting a data group of target current values Fr_ICMD and a data group of target current values Rr_ICMD for PWM control of the active control mounts $M_F$, $M_R$ correspond to 'obtain a data group of target current values from the computed target current value waveform in a predetermined sampling cycle' described in claims. Further, target current values Fr_ICMD, Rr_ICMD correspond to 'a current corresponding to a target current value waveform' described in claims.

As shown in FIG. 5, the series of target current values which are sampled from target current value waveforms $I_{TFr}$, $I_{TFr}$ and given hollow dots are data groups of target current values Fr_ICMD, Rr_ICMD for each cycle of PWM control. The series of target current values which is output with a phase delay by $\delta 0$, which is a half of the cycle of the engine vibration, from the start of the data of the target current values Fr_ICMD is the data group of target current values Rr_ICMD.

Accordingly, when the rotation speed of the engine becomes higher, the time widths of the target current value waveforms $I_{TFr}$, $I_{TRr}$ become shorter, while the target current value waveforms $I_{TFr}$, $I_{TRr}$ are subjected to sampling at the constant cycle $T_{PWM}$ and used to set the data groups of target current values Fr_ICMD, Rr_ICMD. Consequently, the respective numbers of data pieces of the target current values Fr_ICMD, Rr_ICMD that form the data groups of target current values become smaller.

The data group of target current values Fr_ICMD and the data group of target current values Rr_ICMD are output from the drive-pulse-control-signal generation section 237 to the drive-pulse-control-signal output-time correction section 238, and are temporarily stored in the respective target current value temporary storage sections 238a, 238b of the drive-pulse-control-signal output-time correction sections 238.

Further, the drive-pulse-control-signal generation section 237 measures the number $N1_F$, $N1_R$ of data pieces respectively included in the data group of target current values Fr_ICMD and the data group of target current values Rr_ICMD, and obtains positions $NC_F$, $NC_R$ which show the respective sequential numbers of the data of the respective peak current values in the data group of target current values Fr_ICMD and the data group of target current values Rr_ICMD, the sequential numbers being counted from the respective starts of the data included in the respective data groups. Hereinafter, the positions $NC_F$, $NC_R$ will be referred to as 'current peak positions $NC_F$, $NC_R$'.

Thereafter, the drive-pulse-control-signal generation section 237 outputs the cycle length T1, the numbers of data $N1_F$, $N1_R$, and the current peak positions $NC_F$, $NC_R$, to the drive-pulse-control-signal output-time correction section 238. At the drive-pulse-control-signal output-time correction section 238, the cycle length T1, the number $N1_F$ of data pieces, and the current peak position $NC_F$, which have been input, are temporarily stored in the target current value temporary storage section 238a, while the cycle length T1, the number $N1_R$ of data pieces, and the current peak position $NC_R$, which have been input, are temporarily stored in the target current value temporary storage section 238b.

The target current value waveforms generated respectively for the front and rear active control mounts $M_F$, $M_R$ in order to reduce vibration with respect to a certain cycle C1 of engine vibration basically have the same length. Consequently, in general, the number $N1_F$ of data pieces and the number $N1_R$ of data pieces are of the same value, and the current peak position $NC_F$ and the current peak position $NC_R$ are the same position.

Drive-Pulse-Control-Signal Output-Time Correction Section

Returning again to FIG. 3, the drive-pulse-control-signal output-time correction section 238 will be described.

In 'the ENG vibration estimation computation & target current computation processing cycle', the drive-pulse-control-signal output-time correction section 238 receives input of the respective pairs of data for Fr side and Rr side computed by the phase detection section 235, namely, the data of the number $S1_F$ of STGs and the time remainder $P'1_F$, and the data of the number $S1_R$ of STGs and the time remainder $P'1_R$. Further, in 'the ENG vibration estimation computation & target current computation processing cycle', the drive-pulse-control-signal output-time correction section 238 receives input, from the drive-pulse-control-signal generation section 237, of the cycle length T1, the data group of target current values Fr_ICMD, the data group of target current values Rr_ICMD, the above-described numbers $N1_F$, $N1_R$ of data pieces, and the current peak positions $NC_R$, $NC_R$, and these data are temporarily stored in the target current value temporary storage sections 238a, 238b.

Then, under control by the timing control section 230, in the 'target current output processing cycle', based on a TDC pulse signal and crank pulse signals from e engine ECU 100, the drive-pulse-control-signal output-time correction section 238 reads crank pulse intervals for the first stage STG in the cycle of engine vibration and computes the first STG time. Herein, the first STG time refers to the time length corresponding to the first stage STG with stage No. '0' in the 'target current output processing cycle' (refer to FIG. 4).

This first STG time can be easily measured, using clock pulses generated by the microcomputer 200b (refer to FIG. 3). Then, the time remainders $P'1_R$, $P'1_R$, which are temporarily stored in the target current value temporary storage sections 238a, 238b, are read out, and corrected time remainders $P''1_F$, $P''1_R$ are computed by the following Expressions (2A), (2B).

$$P''1_F = (P'1_F)/[(T1)/4] \times (\text{first STG time}) \quad (2A)$$

$$P''1_R = (P'1_R)/[(T1)/4] \times (\text{first STG time}) \quad (2B)$$

Under control by the timing control section 230, in 'the target current output processing cycle', the drive-pulse-control-signal output-time correction section 238 measures crank pulse intervals for the number $S1_F$ of STGs, based on a TDC pulse signal and crank pulse signals which are input from the timing control section 230. Having the time when a crank angle for the number $S1_F$ of STGs has elapsed be 'phase delay reference' on Fr side, the drive-pulse-control-signal output-time correction section 238 outputs the data group of the target current values Fr_ICMD to the drive control section 239A for the active control mount $M_F$ when the corrected time remainder $P''1_F$ has elapsed from 'the phase delay reference' on Fr side.

Further, under control by the timing control section 230, in 'the target current output processing cycle', the drive-pulse-control-signal output-time correction section 238 measures crank pulse intervals for the number $S1_R$ of STGs, based on the TDC pulse signal and the crank pulse signals which are input from the timing control section 230. Having the time when a crank angle for the number $S1_R$ of STGs has elapsed be 'phase delay reference' on Rr side, the drive-pulse-control-signal output-time correction section 238 outputs the data group of the target current values Rr_ICMD to the drive control section 239B for the active control mount $M_R$ when the corrected time remainder $P''1_R$ has elapsed from 'the phase delay reference' on Rr side.

That is, as shown in FIG. 4, in 'the target current output processing cycle', having the timing of receiving the TDC pulse signal be a start point, the data group of the target current values Fr_ICMD is output with the phase delay δ1, and the data group of the target current values Rr_ICMD is output with the phase delay δ2.

Incidentally, in detecting the elapse of the crank angle for the number $S1_F$ of STGs and the elapse of the crank angle for the number $S1_R$ of STGs, instead of using the TDC pulse signal and the crank pulse signals, stage trigger signals that are input from the timing control section 230 may be used to detect the elapse of the crank angle for the number $S1_F$ of STGs (in other words, the elapse of STG time for the number $S1_F$ of STGs) and the elapse of the crank angle for the number $S1_R$ of STGs (in other words, the elapse of STG time for the number $S1_R$ of STGs).

Further, in 'the target current output processing cycle', the drive-pulse-control-signal output-time correction section 238 reads crank pulse intervals in a predetermined number at least larger than or equivalent to the above-described first stage STG, for example, eight crank pulse intervals, and detects a time $t_{C3}$ (refer to FIGS. 13 and 14) for the eight crank pulse intervals. That is, a time $t_{C3}$ required for rotation of the crankshaft by a predetermined crank angle with the TDC pulse signal as a start point, for example, 48 degrees [=(6 degrees)× 8], is computed from the results of measurements of clock pulses of the microcomputer 200b.

Then, with the TDC pulse signal in 'the target current output processing cycle' as a start point, and based on the time $t_{C3}$ required for rotation of the crankshaft by 48 degrees, the drive-pulse-control-signal output-time correction section 238 estimates T3' (refer to diagram (i) of FIG. 12) as the cycle length of engine vibration (corresponding to the cycle length T3 of a third cycle C3, described later, of engine vibration), according to the following Expression (3).

Hereinafter, the value of the predetermined crank angle as an assumption for computing the time $t_{C3}$ will be referred to as DC3.

$$T3' = t_{C3} \times 120/(DC3) \qquad (3)$$

Herein, the crank angle DC3 is larger than or equivalent to one stage STG of crank pulse signals (herein, generated every 6 degrees), and the larger is the value of the crank angle DC3, the more improved is the estimation accuracy of the cycle of engine vibration, at a driving timing. In other words, it is desirable that the crank angle DC3 is set to a value larger than or equal to 30 degrees. However, even if the phase delay δ1 is taken into account in outputting the target current values Fr_ICMD from the drive-pulse-control-signal output-time correction section 238 to the drive control section 239A, it is necessary to compute the time $t_{C3}$ before outputting the peak current position $NC_F$, and the crank angle DC3 is approximately 60 degrees at the maximum. Herein, description will be made, setting the crank angle DC3, for example, to 48 degrees (for eight crank pulse intervals).

Then, the drive-pulse-control-signal output-time correction section 238 computes, from the estimated cycle length T3' of engine vibration and according to the following Expressions (4A), (4B), the number $N2_F$ of data pieces of target current values Fr_ICMD and the number $N2_R$ of data pieces of target current values Rr_ICMD in a case of sampling at a cycle of 500 μsec, wherein target current value waveforms matching with the cycle length T3' corresponding to the third cycle C3 of engine vibration are virtually assumed.

$$N2_F = \text{integer portion of } [(N1_F) \times (T3')/(T1)] \qquad (4A)$$

$$N2_R = \text{integer portion of } [(N1_R) \times (T3')/(T1)] \qquad (4B)$$

The number $N2_F$ and the number $N2_R$ can be represented by the following Expressions (5A), (5B) by substituting Expression (3) into Expressions (4A), (4B).

$$N2_F = \text{integer portion of } [(N1_F) \times (t_{C3} \times 120/(DC3))/(T1)] \qquad (5A)$$

$$N2_R = \text{integer portion of } [(N1_R) \times (t_{C3} \times 120/(DC3))/(T1)] \qquad (5B)$$

Herein, the number $N2_F$ of data pieces and the number $N2_R$ of data pieces are, in general, of the same value.

Then, when the drive-pulse-control-signal output-time correction section 238 reads out the data of the target current values Fr_ICMD with the cycle length $T_{PWM}$ from the target current value temporary storage section 238a and outputs the data to the drive control section 239A, reads out the data of the target current values Rr_ICMD with the cycle length $T_{PWM}$ from the target current value temporary storage section 238 and outputs the data to the drive control section 239B, the drive-pulse-control-signal output-time correction section 238 performs a waveform length adjustment process on the data groups of the target current values such that the numbers $N2_F$, $N2_R$ of data pieces become corresponding to the cycle length T3' having been computed for estimation, depending on magnitude relationship with the number $N1_F$ of data pieces and the number $N2_F$ of data pieces. In short, in outputting the data of data groups of target current values, the numbers of data pieces are adjusted from the original numbers $N1_F$, $N1_R$ of data pieces into the numbers $N2_F$, $N2_R$. Detailed description of this target-current-value waveform length adjustment process will be made in the description of flowcharts in FIGS. 6 to 10.

Herein, the drive-pulse-control-signal output-time correction section 238 corresponds to 'vibration-cycle-during-driving estimation unit' and 'output-time correction unit' described in claims.

Drive Control Section

The drive control section 239A generates a PWM duty instruction corresponding to the data group of target current values Fr_ICMD having been output with the phase delay δ1 from the drive-pulse-control-signal output-time correction section 238 and outputs the PWM duty instruction to the drive circuit 121A. The drive circuit 121A performs current apply control, corresponding to the PWM duty instruction, and supplies current to the actuation section 41 (refer to FIG. 1) of the active control mount $M_F$. The current sensor 123A measures current values supplied from the drive circuit 121A and inputs the current values to the drive control section 239A.

The drive control section 239A takes difference between the target current values Fr_ICMD and the measured current values, and corresponding to the difference, corrects a PWM duty instruction for new target current values Fr_ICMD with a cycle length $T_{PWM}$ of the next PWM control and outputs the corrected duty instruction to the drive circuit 121A.

In such a manner, the drive control section 239A outputs a PWM duty instruction for target current values Fr_ICMD with a feedback, and thus supplies current to the actuation section 41 of the active control mount $M_F$.

Likewise, the drive control section 239B also generates a PWM duty instruction corresponding to the data group of the target current values Rr_ICMD having been output with the phase delay δ2 from the drive-pulse-control-signal output-time correction section 238 and outputs the PWM duty instruction to the drive circuit 121B. The drive circuit 121B performs current apply control, corresponding to the PWM duty instruction, and supplies current to the actuation section 41 (refer to FIG. 1) of the active control mount $M_R$. The current sensor 123B measures current values supplied from the drive circuit 121B and inputs the current values to the drive control section 239B.

The drive control section 239B takes difference between the target current values Rr_ICMD and the measured current values, and corresponding to the difference, corrects a PWM duty instruction for new target current values Rr_ICMD with a cycle length $T_{PWM}$ of the next PWM control and outputs the corrected duty instruction to the drive circuit 121B.

In such a manner, the drive control section 239B outputs a PWM duty instruction for target current values Rr_ICMD with feedback and thus supplies current to the actuation section 41 of the active control mount $M_R$.

Method of Controlling Active Anti-vibration Supporting Device

Referring to FIGS. 6 to 14, and also referring to FIG. 3 as appropriate, a method of controlling the active anti-vibration supporting device 301 will be described below. FIGS. 6 to 10 are flowcharts showing the flow of controlling anti-vibration. FIG. 11 is an illustration of case that the rotation speed of the engine is accelerated, showing a phase delay $P1_F$ computed based on crank pulse signals obtained in a crank-pulse-interval read processing cycle, an adjustment process of a phase delay in a target current output processing cycle, and a correction process of a data group of target current values at the time of outputting a target current value waveform, wherein diagram (a) illustrates the correspondence relationship between the time chart of the crank pulse signals and the cycles of engine vibration; diagram (b) is a time chart of computation processing cycles; and diagram (c) illustrates an adjustment process of a phase delay at the time of outputting a target current value waveform on Fr side, and an adjustment process of the length of the target current value waveform.

As shown in diagram (a) of FIG. 11, in a case that the rotation speed of the engine is accelerated, the cycle of crank pulse signals and engine vibration gradually becomes shorter. The lower part of diagram (a) of FIG. 11 shows that the vibration state estimation section 234 computes cycles of engine vibration, based on twenty crank pulse signals, with the point of time of receiving a TDS pulse signal (not shown) as a start point. Concretely, computed are a cycle length T1 of the first cycle (the first vibration cycle) C1, a cycle length T2 of the second cycle (the second vibration cycle) C2, and a cycle length T3 of the third cycle (the third vibration cycle) C3. The intervals between crank pulse signals in the cycle C2 of engine vibration are shorter than the intervals between crank pulse signals in the cycle C1 of engine vibration, and the intervals between crank pulse signals in the cycle length T3 of engine vibration are even shorter than the intervals between crank pulse signals in the cycle length T2 of engine vibration. Accordingly, the cycle length T2 of the second cycle C2 of engine vibration is shorter than the cycle length T1 of the first cycle C1 of engine vibration, and the cycle length T3 of the third cycle C3 of engine vibration is even shorter than the cycle length T2.

Diagram (b) of FIG. 11 shows computation processing cycles. In the second cycle C2 of engine vibration, the ENG vibration estimation computation & target current computation process is performed on the results of measurements of clock pulses that correspond to the respective crank pulse signals having been subjected to the CRK pulse interval read process in the first cycle C1 of engine vibration, and the target current output process is performed in the third cycle C3 of engine vibration.

Figure 12:
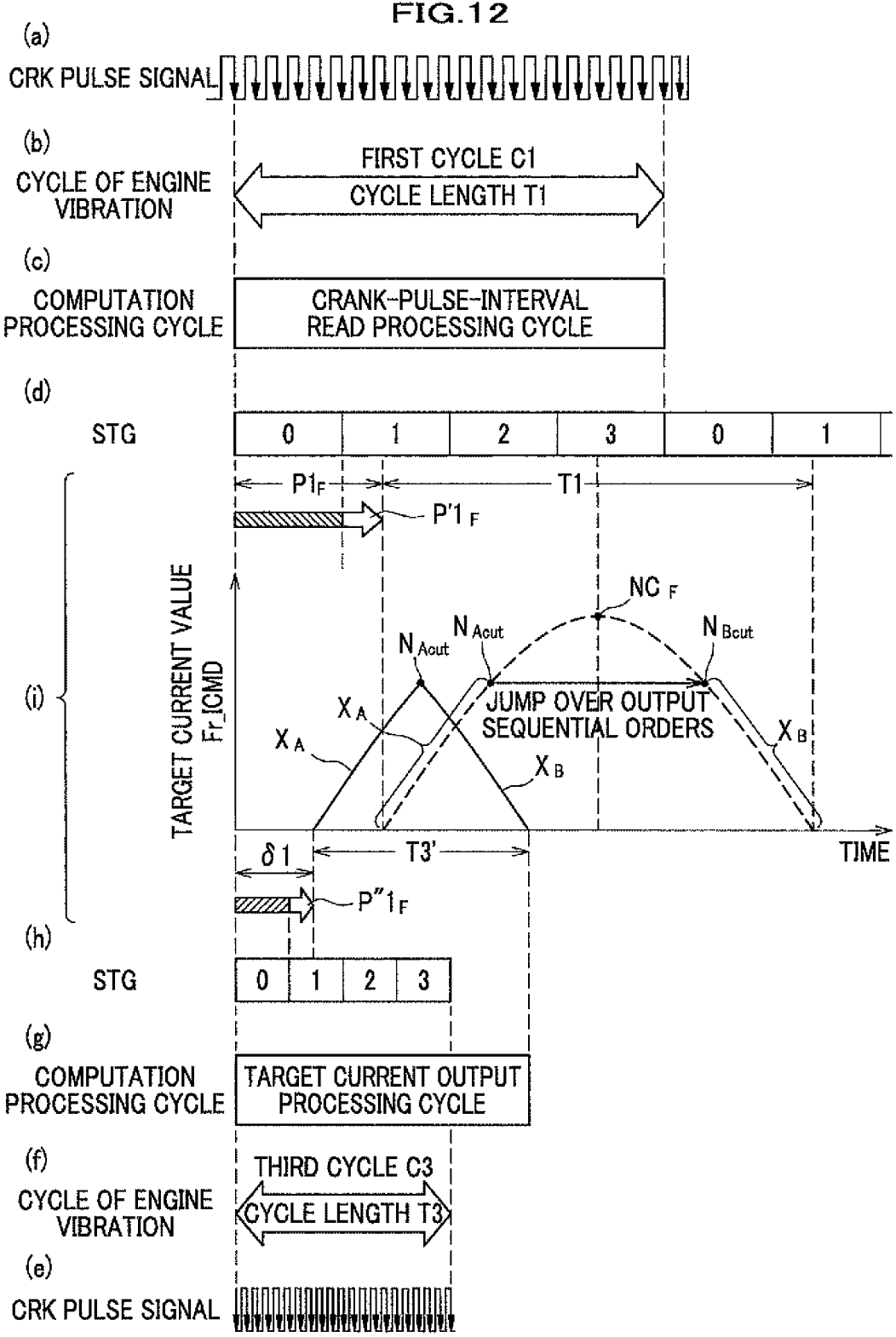
FIG. 12 is a detailed illustration of the case that the rotation speed of the engine is accelerated, showing the output control of target current values Fr_ICMD included in the data group of target current values related to the target current value waveform on Fr side in the target current output processing cycle, wherein diagram (a) is a time chart of the crank pulse signals in the first cycle C1 of engine vibration; diagram (b) illustrates the cycle length T1 of the first cycle C1; diagram (c) is a time chart showing that the crank-pulse-interval read process is performed in a section with the cycle length T1 of the first cycle C1; diagram (d) is a time chart showing divisions with respective stages STGs in a crank-pulse-interval read processing cycle; diagram (e) is a time chart of crank pulse signals in the third cycle C3 of engine vibration; diagram (f) illustrates the cycle length T3 of the third cycle C3; diagram (g) is a time chart showing that a target current output process is performed, wherein the process starts corresponding to the section with the cycle T3 of the third cycle C3; diagram (h) is a time chart showing divisions with respective stages STGs in the cycle T3 of the third cycle C3; and diagram (i) is a diagram of comparison between a data group of target current values Fr_ICMD, with the phase delay $P1_F$ and the cycle length T1, computed corresponding to the first cycle C1 of engine vibration, and a data group of target current values Fr_ICMD being actually output with a corrected phase delay δ1 and a corrected cycle T3' in the third cycle C3 of engine vibration.

FIG. 12 is a detailed illustration of the case that the rotation speed of the engine is accelerated, showing the output control of target current values Fr_ICMD included in a data group of target current values related to a target current value waveform on Fr side in a target current output processing cycle, wherein diagram (a) is a time chart of the crank pulse signals in the first cycle C1 of the engine vibration; diagram (b) illustrates the cycle length T1 of the first cycle C1; diagram (c) is a time chart showing that the crank pulse interval read process is performed in the section with the cycle length T1 of the first cycle C1; diagram (d) is a time chart showing divisions with respective stages STGs in a crank pulse interval read processing cycle; diagram (e) is a time chart of crank pulse signals in the third cycle C3 of engine vibration; diagram (f) illustrates the cycle length T3 of the third cycle C3; diagram (g) is a time chart showing that a target current output process is performed, wherein the process starts corresponding to the section with the cycle length T3 of the third cycle C3; diagram (h) is a time chart showing divisions with respective stages STGs in the cycle length T3 of the third cycle C3; and diagram (i) is a diagram of comparison between the data group of the target current values Fr_ICMD with the phase delay $P1_F$ computed corresponding to the first cycle C1 of engine vibration and the cycle length T1, and the data group of target current values Fr_ICMD being actually output with a corrected phase delay $\delta 1$ and a corrected cycle T3' in the third cycle C3 of engine vibration.

Figure 6:
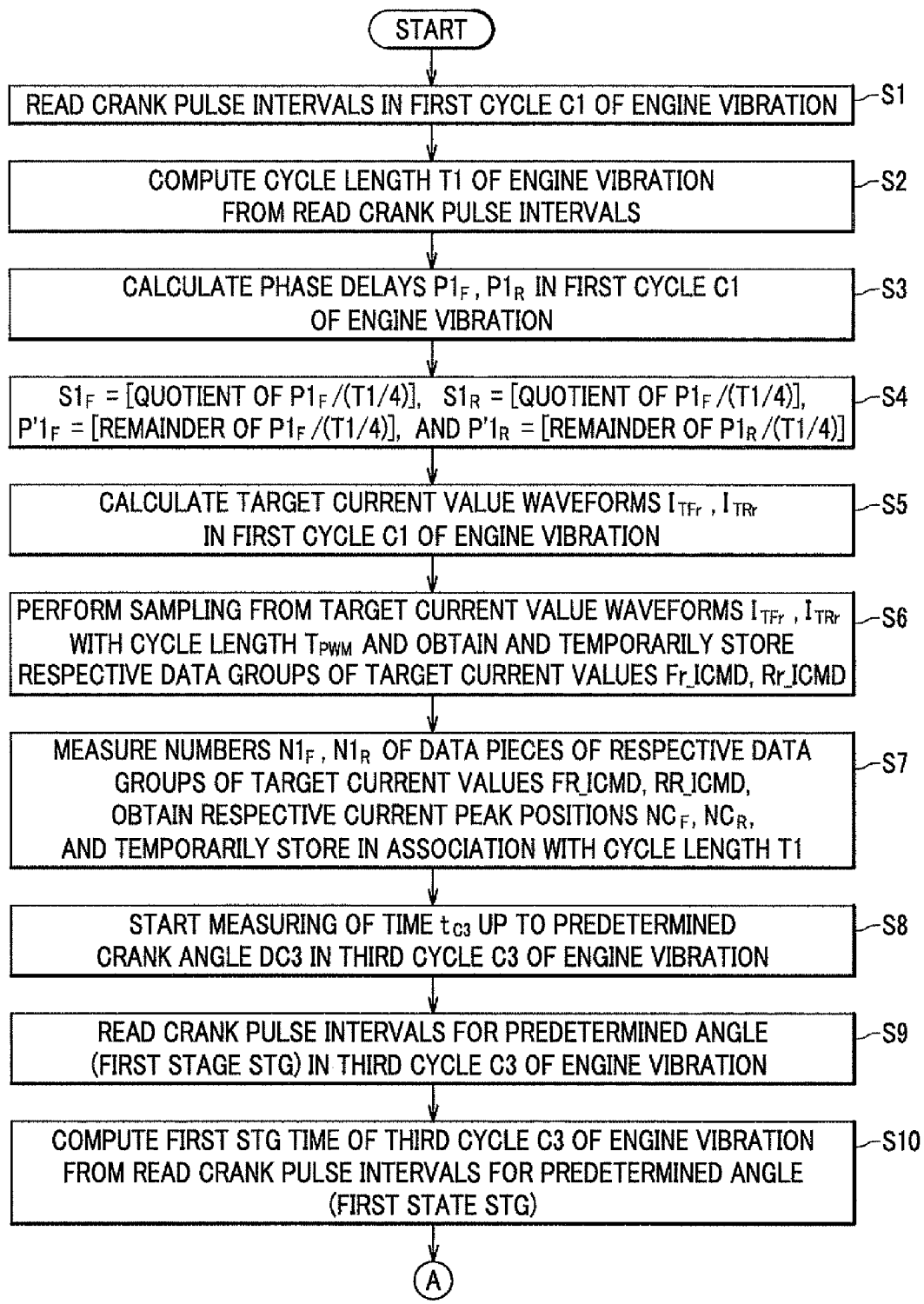
FIG. 6 is a flowchart showing a flow of anti-vibration control.

In step S1 in FIG. 6, the CRK-pulse-read-time temporary storage section 231 is controlled by the timing control section 230 to read the crank pulse intervals in the first cycle C1 of engine vibration, as shown in diagrams (a) and (b) of FIG. 11. Concretely, the CRK-pulse-read-time temporary storage section 231 reads the results of measurements of clock pulses measured, in association with twenty crank pulse signals of the microcomputer 200b which are continuous from the point of time of receiving a TDC pulse signal as a start point in the first cycle C1 of engine vibration, and temporarily stores the measurement results. That is, the CRK-pulse-read-time temporary storage section 231 performs 'the CRK interval read processing cycle'.

In step S2, as shown in diagrams (a) and (b) in FIG. 11, in the computation processing cycle of 'the ENG vibration estimation computation & target current computation processing cycle' corresponding to the second cycle C2 of engine vibration, the vibration state estimation section 234 is controlled by the timing control section 230 to compute the cycle length T1 of engine vibration from the crank pulse intervals having been read in step S1. The amplitude of engine vibration is also computed as described above.

Concretely, the vibration state estimation section 234 reads out the results of measurements of the clock pulses in a number corresponding to the twenty crank pulse signals, the results of measurements having been stored in the CRK-pulse-read-time temporary storage section 231 in 'the CRK interval read processing cycle'. Then, in the computation processing cycle of 'the ENG vibration estimation computation & target current computation processing cycle' corresponding to the second cycle C2 of engine vibration shown in diagrams (a) and (b) in FIG. 11, the vibration state estimation section 234 computes a time for the twenty crank pulse intervals and thereby computes the cycle length T1 of the first cycle C1 of engine vibration.

In step S3, the phase detection section 235 is controlled by the timing control section 230 to compute phase delays $P1_F$, $P1_R$ in the first cycle C1 of engine vibration. This computation is also performed in the computation processing cycle of 'the ENG vibration estimation computation & target current computation processing cycle' corresponding to the second cycle C2 of engine vibration shown in diagrams (a) and (b) of FIG. 11.

In step S4, the phase detection section 235 is controlled by the timing control section 230 to divide the phase delays $P1_F$, $P1_R$ by the average STG time (T1/4) of the first cycle C1 of engine vibration to thereby compute the numbers $S1_F$, $S1_R$ of STGs and time remainders $P'1_F$, That is, the phase detection section 235 computes $S1_F$=[quotient of $P1_F/(T1/4)$], $S1_R$=[quotient of $P1_R/(T1/4)$], $P'1_F$=[remainder of $P1_F/(T1/4)$], and $P'1_R$=[remainder of $P1_R/(T1/4)$]. This computation is also performed in the computation processing cycle of 'the ENG vibration estimation computation & target current computation processing cycle' corresponding to the second cycle C2 of engine vibration shown in diagrams (a) and (b) of FIG. 11.

In step S5, the target current computation section 236 is controlled by the timing control section 230 to compute target current value waveforms $I_{TFr}$, $I_{TRr}$ on both of Fr side and Rr side of the first cycle C1 in engine vibration. This computation is also performed in the computation processing cycle of 'the ENG vibration estimation computation & target current computation processing cycle' corresponding to the second cycle C2 of engine vibration shown in diagrams (a) and (b) of FIG. 11.

In step S6, the drive-pulse-control-signal generation section 237 is controlled by the timing control section 230 to perform sampling from the target current value waveforms $I_{TFr}$, $I_{TRr}$ computed in step S5 with the cycle length $T_{PWM}$ to obtain the respective data groups of the target current values Fr_ICMD, Rr_ICMD. Then, the drive-pulse-control-signal output-time correction section 238 temporarily stores the data groups in the target current value temporary storage sections 238a, 238b. This process is performed in the computation processing cycle of 'the ENG vibration estimation computation & target current computation processing cycle' corresponding to the second cycle C2 of engine vibration shown in diagrams (a) and (b) of FIG. 11.

In step S7, the drive-pulse-control-signal generation section 237 is controlled by the timing control section 230 to measure the numbers $N1_F$, $N1_R$ of data pieces of the respective data groups of the target current values Fr_ICMD, Rr_ICMD obtained in step S6, and obtain respective current peak positions $NC_F$, $NC_R$. In association with the cycle length T1, the drive-pulse-control-signal output-time correction section 238 temporarily stores the numbers $N1_F$, $N1_R$ of data pieces and the current peak positions $NC_F$, $NC_R$ in the target current value temporary storage sections 238a, 238b. This process is performed in the computation processing cycle of 'the ENG vibration estimation computation & target current computation processing cycle' corresponding to the second cycle C2 of engine vibration shown in diagrams (a) and (b) of FIG. 11.

In step S8, the drive-pulse-control-signal output-time correction section 238 is controlled by the timing control section 230 to start measuring of time $t_{C3}$ up to the predetermined crank angle DC3 in the third cycle C3 of engine vibration. Concretely, measurements of clock pulses corresponding to the predetermined crank angle DC3, for example, clock pulses for eight crank pulse intervals with a TDC pulse as the start point, is started. Processing from and after step S8 is performed by the drive-pulse-control-signal output-time correction section 238 in the computation processing cycle of 'the target current processing cycle' corresponding to the third cycle C3 of engine vibration shown in diagrams (a) and (b) of FIG. 11.

In step S9, crank pulse intervals for a predetermined angle (corresponding to the first stage STG (the stage STG with a stage No. '0')) in the third cycle C3 of engine vibration are read. This process is performed in the computation processing cycle of 'the target current processing cycle' corresponding to the third cycle C3 of engine vibration shown in diagrams (a) and (b) of FIG. 11.

In step S10, the first STG time of the third cycle C3 of engine vibration is computed from the crank pulse intervals, having been read in step S9, for the predetermined angle (the first state STG). This process is performed in the computation processing cycle of 'the target current processing cycle' corresponding to the third cycle C3 of engine vibration shown in diagrams (a) and (b) of FIG. 11. After step S10, the process proceeds to step S11 in FIG. 7, according to the connector (A).

In step S11, the time remainders $P'1_F$, $P'1_R$ are corrected (refer to Expressions (2A), (2B)).

In step S12A, with reference for phase delay to the completion of stages STGs in the number $S1_F$ of STGs, the target current values Fr_ICMD are output to the drive control section 239A after the time remainder $P''1_F$ has elapsed. Concretely, after the time remainder $P''1_F$ has elapsed, with reference for phase delay to the time of detection of completion of stages STGs in the number $S1_F$ of STGs (in other words, elapse of STG time for the number $S1_F$ of STGs), the drive-pulse-control-signal output-time correction section 238 outputs the data group of the target current values Fr_ICMD to the drive control section 239A for active control mount $M_F$ on the front side.

In step S12B, after elapse of the time remainder $P''1_R$ with reference for phase delay to the completion of stages STGs in the number $S1_R$ of STGs, the target current values Rr_ICMD are output to the drive control section 239B. Concretely, after the time remainder $P''1_R$ has elapsed, with reference for phase delay to the time of detection of completion of stages STGs in the number $S1_R$ of STGs (in other words, elapse of STG time for the number $S1_R$ of STGs), the drive-pulse-control-signal output-time correction section 238 outputs the data group of the target current values Rr_ICMD to the drive control section 239B for active control mount $M_R$ on the rear side.

In such a manner, the target current output process by the drive-pulse-control-signal output-time correction section 238 sets 'reference for phase delay' to the time when a STG time for the number $S1_F$ of STGs has elapsed, as shown by the example, in diagram (i) of FIG. 12, of the output of the target current values Fr_ICMD for the active control mount $M_F$ on the front side.

Incidentally, diagram (i) of FIG. 12 shows an example of a case the number of STGs $S1_F=1$.

Then, the target current values Fr_ICMD are output after the corrected time remainder $P''1_F$ has elapsed from the reference for phase delay, and the phase delay is thus adjusted to a delay time $\delta 1$ corresponding to the cycle length T3 of the third cycle C3.

Concretely, as the rotation speed of the engine has increased, the STG time for the number $S1_F$ of STGs of the third cycle C3 is shorter than the result of the product of the number $S1_F$ of STGs and the average STG time ((T1)/4) of the first cycle C1. Therefore, the phase delay is corrected, corresponding to the increase in the rotation speed of the engine.

In step S13, it is determined whether or not the rotation angle has reached a predetermined crank angle DC3. That is, it is determined whether or not a predetermined number of crank pulse intervals, for example, eight crank pulse intervals, have been measured. If it is determined that the rotation angle has reached the predetermined crank angle DC3 (Yes), the process proceeds to step S14, and if not (No), the process repeats step S13.

In step S14, the time $t_{C3}$ up to the time when the rotation angle has reached the predetermined crank angle DC3 is obtained.

In step S15, the numbers $N2_F$, $N2_R$ of data pieces in the third cycle C3 of engine vibration are estimated. The numbers $N2_F$, $N2_R$ of data pieces can be computed, according to the above-described Expressions (5A), (5B).

In step S16, it is determined whether the number $N1_F$ of data pieces is larger than the number $N2_F$ of data pieces ([$N1_F > N2_F$?]). If it is determined that the number $N1_F$ of data pieces is larger than the number $N2_F$ of data pieces (Yes), the process proceeds to step S17, and if not (No), the process proceeds to step S31. Herein, determination that the number $N1_F$ of data pieces is larger than the number $N2_F$ of data pieces means that the rotation speed of the engine has increased. In contrast, determination that the number $N1_F$ of data pieces is smaller than or equal to the number $N2_F$ of data pieces means that the rotation speed of the engine has decreased or unchanged.

Target Current Value Waveform Length Adjustment Process in Case of Increase in Rotation Speed of Engine The following steps S17 to S29 shows the flow of the target current value waveform length adjustment process by the drive-pulse-control-signal output-time correction section 238 in a case that the rotation speed of the engine is increasing, concretely, the flow of an adjustment process of the number of outputs of data pieces included in the data group of the target current values Fr_ICMD and an adjustment process of the number of outputs of data pieces included in the data group of the target current values Rr_ICMD. Particularly, the steps S19 to S23 represent the process of adjusting the number of data pieces which are included in the data group of the target current values Fr_ICMD and are to be output, and the steps S24 to S28 represent the process of adjusting the number of data pieces which are included in the data group of the target current values Rr_ICMD and to be output. Then, the process returns from step S29 to step S19, and repeatedly adjusts the respective numbers of data pieces which are included in the data groups of the target current values Fr_ICMD and the target current values Rr_ICMD and are to be output.

Incidentally, the process in steps from S13 to S29 is performed without causing a delay of the timing of outputting the data of target current values Fr_ICMD to the drive control section 239A after the phase delay δ1 with a cycle length $T_{PWM}$, for example, at cycle intervals of 500 μsec, and without causing a delay of the timing of outputting the data of target current values Rr_ICMD to the drive control section 239B after the phase delay δ2 with the cycle length $T_{PWM}$.

Figure 8:
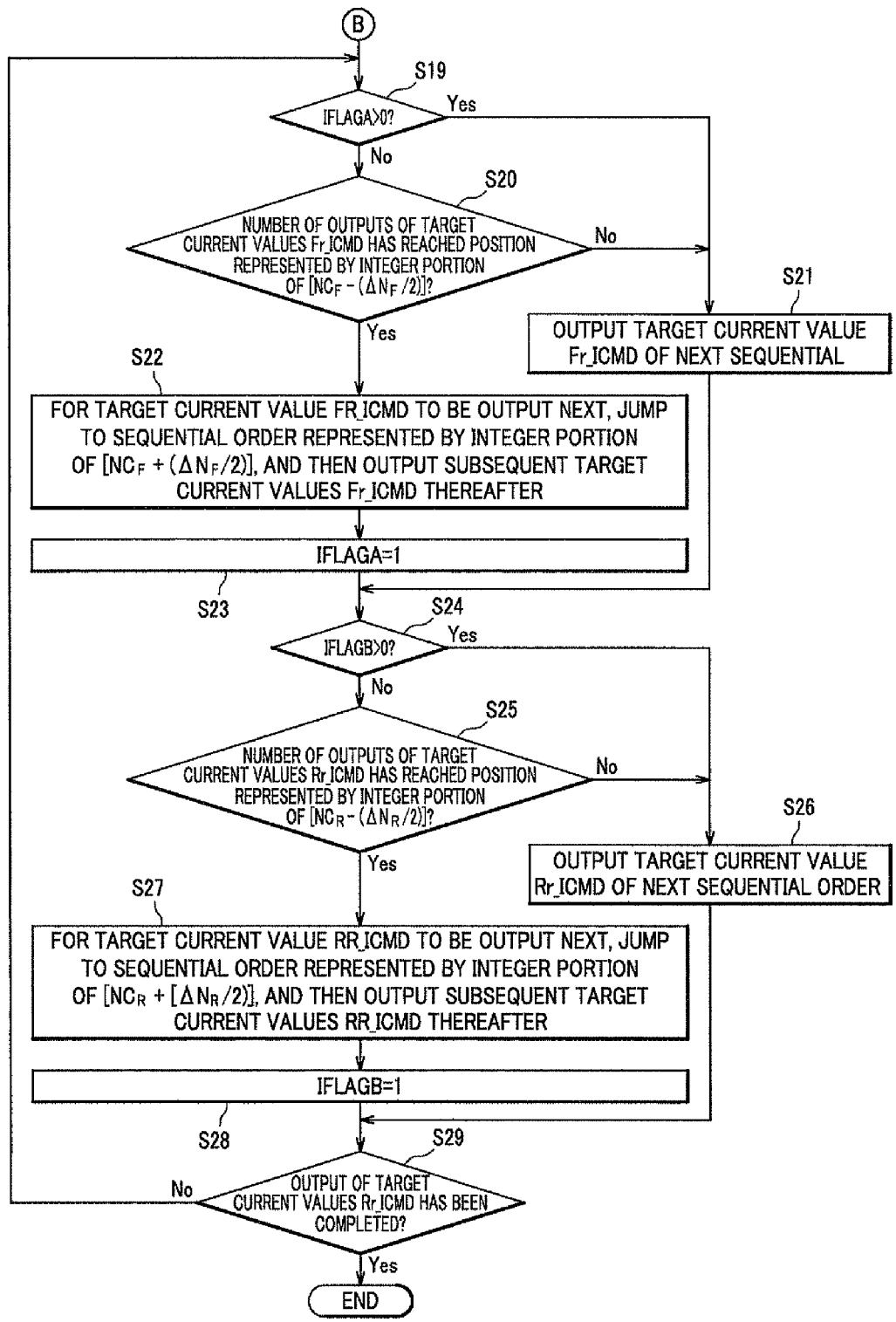
FIG. 8 is a flowchart showing a flow of the anti-vibration control.

In step S17, differences $\Delta N_F$ ($=N1_F-N2_F$), $\Delta N_R$ ($=N1_R-N2_R$) in the number of data pieces are computed, then in step S18, flags IFLAGA, IFLAGB are initialized (=0), and the process proceeds to step S19 in FIG. 8, according to the connector (B).

Herein, when the drive-pulse-control-signal output-time correction section 238 reads out the data group of target current values Fr_ICMD stored in the target current value temporary storage section 238a and outputs the data group to the drive control section 239A, the flag IFLAGA is used to represent whether a certain number $\Delta N_F$ of data pieces have been already jumped or not yet jumped to adjust the length of the target current value waveform for matching it with the number $N2_F$ of data pieces estimated in step S15. Likewise, when the drive-pulse-control-signal output-time correction section 238 reads out the data group of target current values Rr_ICMD stored in the target current value temporary storage section 238b and outputs the data group to the drive control section 239B, the flag IFLAGB is used to represent whether a certain number $\Delta N_R$ of data pieces have been already jumped or not yet jumped to adjust the length of the target current value waveform for matching it with the number $N2_R$ of data pieces estimated in step S15.

In step S19, it is determined whether or not the flag IFLAGA is larger than zero ([IFLAGA>0?]). If the flag IFLAGA is larger than zero (Yes), the process proceeds to step S21, and if not (No), the process proceeds to step S20. At first, as the process is before jumping and outputting data for the above-described adjustment of the length of the target current value waveform, the process proceeds to step S20. In step S20, it is checked whether or not the number of outputs of target current values Fr_ICMD has reached the position represented by the integer portion of [$NC_F-(\Delta N_F/2)$]. If the number has reached the position represented by the integer portion of [$NC_F-(\Delta N_F/2)$], in other words, the number has reached the position represented by '$N_{Acut}$' in diagram (i) of FIG. 12 (Yes), the process proceeds to step S22, and if not yet reached (No), the process proceeds to step S21.

If the process is shortly after a start of outputting target current values Fr_ICMD, as the number of outputs of target current values Fr_ICMD has not yet reached the position represented by the integer portion of [$NC_F-(\Delta N_F/2)$], the process proceeds to step S21, and a target current value Fr_ICMD of the next sequential order is read out from the target current value temporary storage section 238a and output to the drive control section 239A. Then, the process proceeds to step S24. Thereafter, in steps S24-S29, as described later, it is checked whether or not output of target current values Rr_ICMD has been completed. If output of target current values Rr_ICMD has not been completed yet, the process returns to step S19.

With Yes in step S20, when the process proceeds to step S22, for a target current value Fr_ICMD to be read next from the target current value temporary storage section 238a and to be output to the drive control section 239A, reading and outputting of target current values Fr_ICMD is jumped to the sequential order represented by the integer portion of [$NC_F+(\Delta N_F/2)$], namely to one at the position represented by '$N_{Bcut}$' in diagram (i) of FIG. 12, and then, subsequent target current values Fr_ICMD thereafter are read out and output from the target current value temporary storage section 238a.

That is, the next output of a target current value Fr_ICMD is jumped to one with a sequential order represented by the integer portion of [$NC_F+(\Delta N_F/2)$], and subsequent target current values Fr_ICMD thereafter are output. Then, in step S23, the flag IFLAGA is turned on ('IFLAGA=1') to represent the fact that output of data of target current values Fr_ICMD has been jumped from the position represented by the integer portion of [$NC_F-(\Delta N_F/2)$], to the position represented by the integer portion of [$NC_F+(\Delta N_F/2)$].

Thereafter, the process proceeds to steps S24-S29, as described later, and in step S29, it is checked whether or not output of target current values Rr_ICMD has been completed. If output of target current values Rr_ICMD has not been completed yet, the process returns to step S19. As the flag IFLAGA is on (IFLAGA>0), with Yes in step S19, the process proceeds to step S21. Then, in step S21, a target current value Fr_ICMD of the next sequential order is read out from the target current value temporary storage section 238a to be output to the drive control section 239A.

As a result, although a data group of target current values Fr_ICMD as shown by a dashed curve in diagram (i) of FIG. 12 is stored in the target current value temporary storage section 238a, actual reading and outputting of a data group of target current values Fr_ICMD from the target current value temporary storage section 238a starts with a phase delay of δ1, as shown by a solid curve in diagram (i) of FIG. 12. When the part of the solid curve $X_A$ is completed, reading and outputting is jumped from the position $N_{ACut}$ to the position $N_{BCut}$, and the part of the solid curve $X_B$ is output. In such a manner, a data group of target current values Fr_ICMD is output to the drive control section 239A.

FIG. 13 is an illustration of a method, in the case that the rotation speed of the engine is accelerated, of correcting the data group of target current values Fr_ICMD related to the target current value waveform on Fr side, the correction being performed by a drive-pulse-control-signal output-time correction section, wherein diagram (a) illustrates data of the target current values Fr_ICMD on Fr side, in a number of $N1_F$ of data pieces, generated corresponding to the cycle length T1 of the first cycle C1 of engine vibration and the current peak position $NC_F$; diagram (b) illustrates specifying data in a number of $\Delta N_F$ of data pieces, which are around the current peak position $NC_F$ and not to be output, so that the number $N2_F$ of data pieces corresponds to the estimated cycle length T3' of the third cycle C3 of the engine vibration; and diagram (c) illustrates the target current values Fr_ICMD that are output, jumping over the data in the number $\Delta N_F$ of data pieces around the current peak position $NC_F$.

As shown in FIG. 13, by outputting data with a jump over the data in the number $\Delta N_F$ of data pieces around the current peak position $NC_F$, the data is easily output as target current values Fr_ICMD which are symmetric with respect to, and before and after, the current peak position $NC_F$ as the temporal center. Accordingly, appropriate control of vibration insulation can be performed, matching with a cycle deviation ΔT.

In FIG. 13, target current values Fr_ICMD on Fr side have been representatively described. Target current values Rr_ICMD on Rr side can also be likewise controlled for output, with the phase delay δ2 (=δ1+δ0) instead of the phase delay δ1.

In step S21, when reading of the data group of target current values Fr_ICMD stored in the target current value temporary storage section 238a has been completed, though not shown, the data group of target current values Fr_ICMD of the second cycle C2 of engine vibration gets stored in the target current value temporary storage section 238a, and drive control of the active control mount $M_F$ by the drive-pulse-control-signal output-time correction section 238 and the drive control section 239A is started. Such drive control is omitted in this flowchart for brevity.

Steps S24 to S29 representing the process of adjusting the number of data pieces which are included in the data group of target current values Rr_ICMD and are to be output will be described below.

In step S24, it is determined whether or not the flag IFLAGB is larger than zero ([IFLAGB>0?]). If the flag IFLAGB is larger than zero (Yes), the process proceeds to step S26, and If not (No), the process proceeds to step S25. At first, as the process is before jumping and outputting for the above-described adjustment of the length of the target current value waveform, the process proceeds to step S25. In step S25, it is checked whether or not the number of outputs of target current values Rr_ICMD has reached the position represented by the integer portion of $[NC_R-(\Delta N_R/2)]$. If the number has reached the position represented by the integer portion of $[NC_R-(\Delta N_R/2)]$ (Yes), the process proceeds to step S27, and if not yet reached (No), the process proceeds to step S26. If the process is shortly after a start of outputting target current values Rr_ICMD, as the number of outputs of target current values Rr_ICMD has not yet reached the position represented by the integer portion of $[NC_R-(\Delta N_R/2)]$, the process proceeds to step S26, and a target current value Rr_ICMD of the next sequential order is read out from the target current value temporary storage section 238b and output to the drive control section 239B. Then, the process proceeds to step S29, and it is checked whether or not output of target current values Rr_ICMD has been completed. If output of target current values Rr_ICMD has not been completed yet (No), the process goes through steps S19-S21 or through steps S19-S23, and proceeds to step S24.

With Yes in step S25, when the process proceeds to step S27, for a target current value Rr_ICMD to be read next from the target current value temporary storage section 238b and to be output to the drive control section 239B, reading and outputting of target current values Rr_ICMD is jumped to the sequential order represented by the integer portion of $[NC_R+(\Delta N_R/2)]$, and then, subsequent target current values Rr_ICMD thereafter are read out from the target current value temporary storage section 238b to be output. That is, the next output of a target current value Rr_ICMD is jumped to one with a sequential order represented by the integer portion of $[NC_R+(\Delta N_R/2)]$, and subsequent target current values Rr_ICMD thereafter are output. Then, the flag IFLAGB is turned on ('IFLAGB=1') to represent the fact that output of data of target current values Rr_ICMD has been jumped from the position represented by the integer portion of $[NC_R-(\Delta N_R/2)]$, to the position represented by the integer portion of $[NC_R+(\Delta N_R/2)]$.

Thereafter, the process proceeds to step to S29, and it is checked whether or not output of target current values Rr_ICMD has been completed. If output of target current values Rr_ICMD has not been completed yet (No), the process returns to step S19. If output of target current values Rr_ICMD has been completed (Yes), the control of anti-vibration for one cycle in a case of increase in the rotation speed of the engine is completed.

Returning to FIG. 7, a case that, with No in step S16, the process proceeds to step S31 will be described below.

In step S31, it is determined whether or not the number $N1_F$ of data pieces and the number $N2_F$ of data pieces are of the same value ($[N1_F=N2_F?]$). If the same value (Yes), the process proceeds to step S55 to output the target current values Fr_ICMD and the target current values Rr_ICMD as they are. A case that the number $N1_F$ of data pieces and the number $N2_F$ of data pieces are of the same value means that the rotation speed of the engine is constant. Accordingly, concretely, the target current values Fr_ICMD stored in the target current value temporary storage section 238a are read out with the cycle length $T_{PWN}$, to be output to the drive control section 239A, and the target current values Rr_ICMD stored in the target current value temporary storage section 238b are read out with the cycle length $T_{PWM}$ to be output to the drive control section 239B.

Process of Adjusting Length of Target Current Value Waveform in Case of Decrease in Rotation Speed of Engine No in step S31 means that the rotation speed of the engine is decreased, and the process proceeds to step S32.

The following steps S32 to S54 represent the flows, in a case of decrease in the rotation speed of the engine, of the target-current-value waveform adjustment process by the drive-pulse-control-signal output-time correction section 238, namely the process of adjusting the number of data pieces which are included in the data group of target current values Fr_ICMD and are to be output and the process of adjusting the number of data pieces which are included in the data group of target current values Rr_ICMD and are to be output. Particularly, the steps S34 to S43 represent the process of adjusting the number of data pieces which are included in the data group of the target current values Fr_ICMD and are to be output, and the steps S44 to S53 represent the process of adjusting the number of data pieces which are included in the data group of the target current values Rr_ICMD and are to be output. Then, the process returns from step S54 to step S34, and repeatedly adjusts the numbers of data pieces which are included in the data groups of the target current values Fr_ICMD and the target current values Rr_ICMD and are to be output.

The process in steps from S31 to S54 is performed without causing a delay of timing of outputting the data of target current values Fr_ICMD to the drive control section 239A after the phase delay δ1 with a cycle length $T_{PWM}$, for example, at cycle intervals of 500 μsec, and without causing a delay of timing of outputting the data of target current values Rr_ICMD to the drive control section 239B after the phase delay δ2 with the cycle length $T_{PWM}$.

Figure 9:
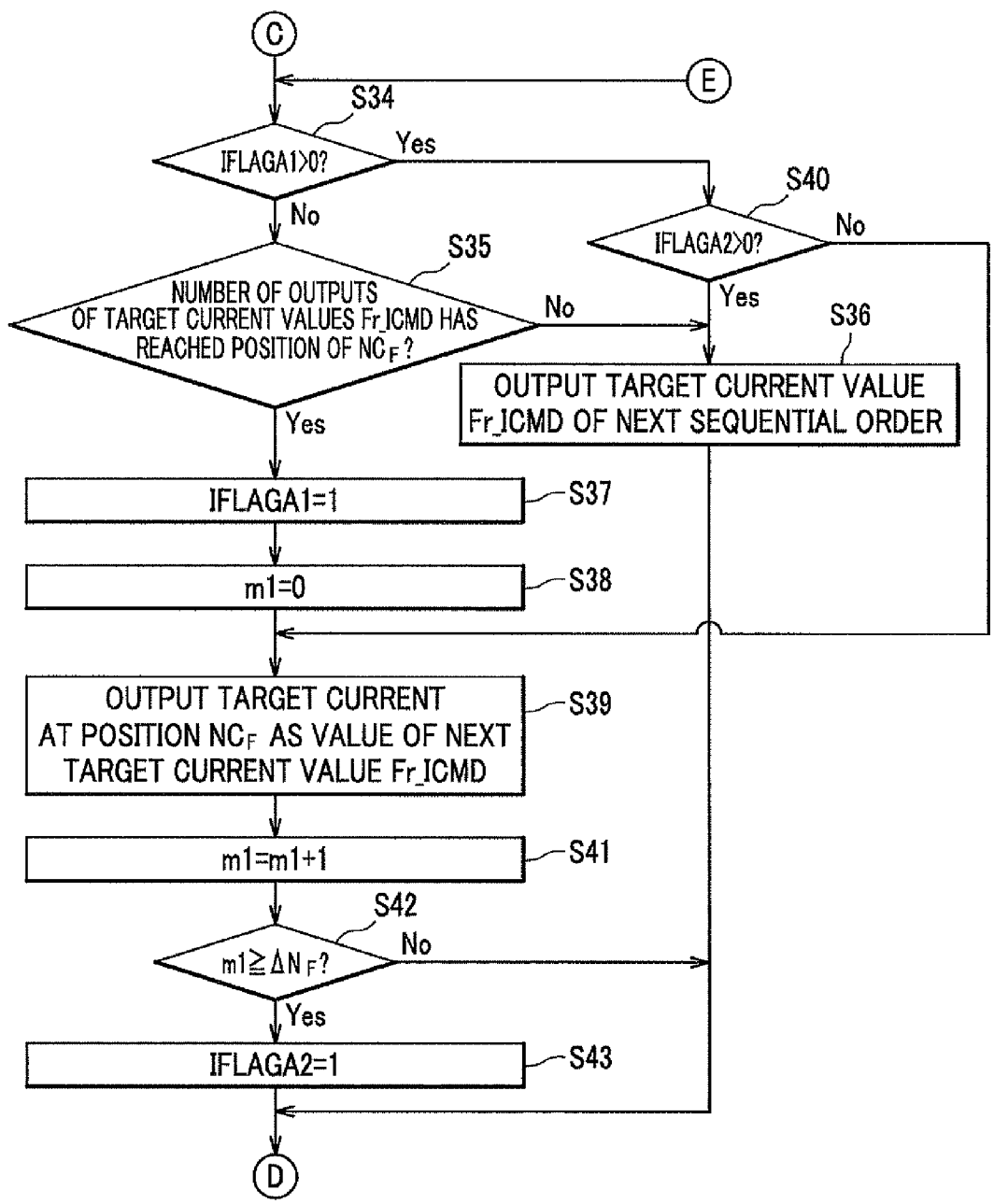
FIG. 9 is a flowchart showing a flow of the anti-vibration control.
Figure 10:
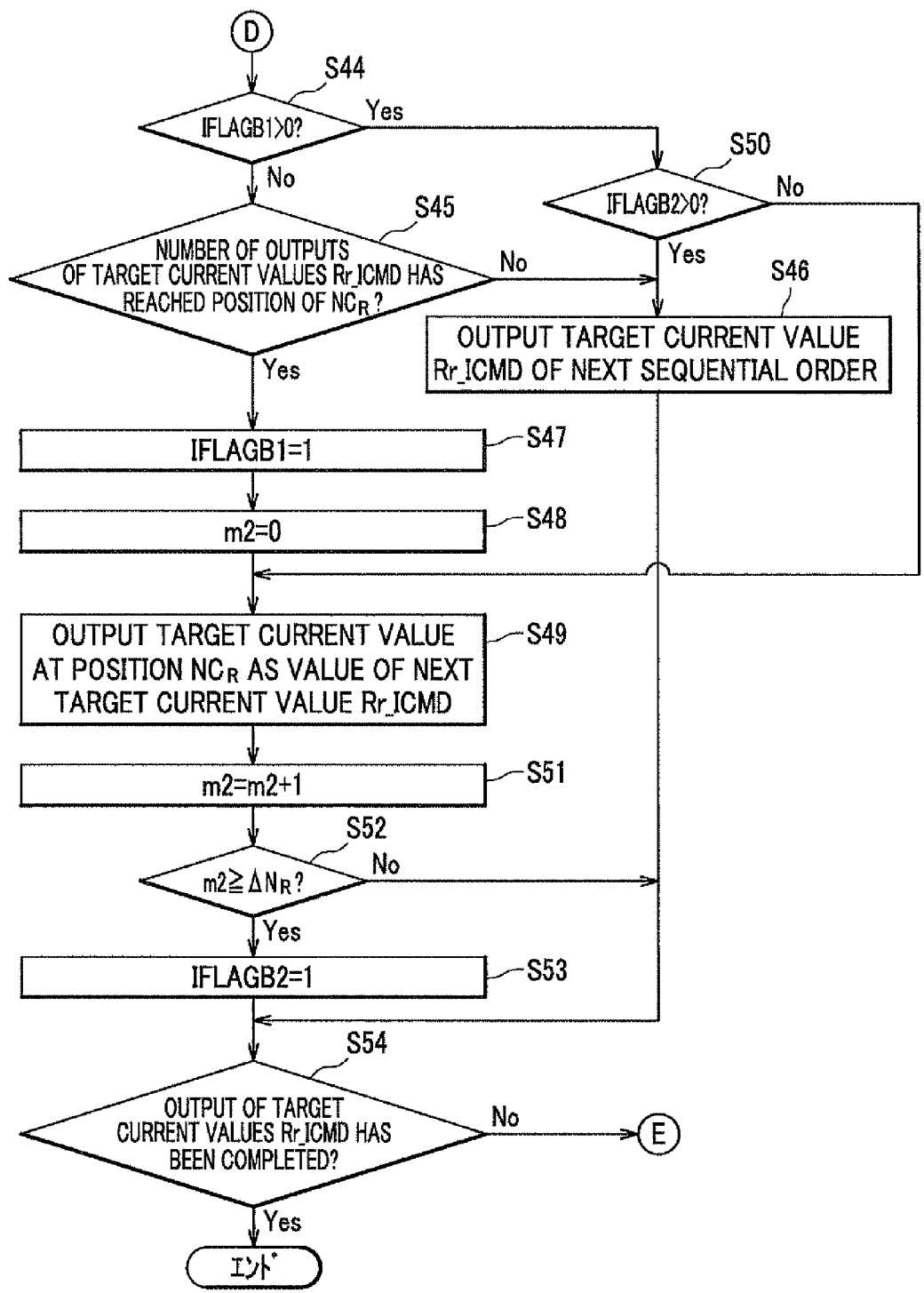
FIG. 10 is a flowchart showing a flow of the anti-vibration control.

In step S32, differences in the number of data pieces $\Delta N_F$ ($=N2_F-N1_F$), $\Delta N_R$ ($=N2_R-N1_R$) are computed, then in step S33, flags IFLAGA1, IFLAGB1, OFLAGA2, and IFLAGB2 are initialized (=0), and the process proceeds to step S34 in FIG. 9, according to the connector (C).

Herein, when the drive-pulse-control-signal output-time correction section 238 reads out the data of target current values Fr_ICMD stored in the target current value temporary storage section 238a and outputs the data to the drive control section 239A, the flag IFLAGA1 is used to represent whether adding and outputting of a certain number $\Delta N_F$ of the data pieces of the target current value Fr_ICMD at the current peak position have been already started or not yet, to adjust the length of the target current value waveform for matching it with the number $N2_F$ of data pieces estimated in step S15. Likewise, when the drive-pulse-control-signal output-time correction section 238 reads out the data of target current values Rr_ICMD stored in the target current value temporary storage section 238b and outputs the data to the drive control section 239B, the flag IFLAGB1 is used to represent whether adding and outputting of a certain number $\Delta N_R$ of data pieces of the target current value Rr_ICMD at the current peak position have been already started or not yet to adjust the length of the target current value waveform for matching it with the number $N2_R$ of data pieces estimated in step S15.

Following the start of adding and outputting of the target current value Fr_ICMD or the target current value Rr_ICMD at the above-described current peak position, the flags IFLAGA2, IFLAGB2, are used to represent whether adding and outputting of the certain number $\Delta N_F$ or $\Delta N_R$ of data pieces have been completed or not yet.

In step S34, it is determined whether or not the flag IFLAGA1 is larger than zero ([IFLAGA1>0?]). If the flag IFLAGA1 is larger than zero (Yes), the process proceeds to step S40, and if not (No), the process proceeds to step S35. At first, the above-described process of adding the target current value Fr_ICMD at the current peak position $NC_F$ in the number $\Delta N_F$ of data pieces for adjustment of the length of the target current value waveform has not yet been started, and the process accordingly proceeds to step S35. In step S35, it is checked whether or not the number of outputs of target current values Fr_ICMD has reached the position of $NC_F$ (the current peak position $NC_F$) obtained in step S7. If the number of outputs of target current values Fr_ICMD has reached the current peak position $NC_F$ (Yes), the process proceeds to step S37, and if not (No), the process proceeds to step S36. If the process is shortly after a start of outputting target current values Fr_ICMD, as the number of outputs of target current values Fr_ICMD has not yet reached the current peak position $NC_F$, the process proceeds to step S36, and a target current value Fr_ICMD of the next sequential order is read out from the target current value temporary storage section 238a and output to the drive control section 239A. Then, the process proceeds to step S44 in FIG. 10, according to the connector (D). Thereafter, as described later, the process proceeds to steps S44-S54, and it is checked whether or not output of target current values Rr_ICMD has been completed. If output of target current values Rr_ICMD has not been completed yet, the process returns to step S34.

With Yes in step S35, the process proceeds to step S37, and then the flag IFLAGS1 is turned on (IFLAG1=1). Then, in step S38, a number m1 of additional data pieces for adding data pieces, in the number $\Delta N_F$, of the target current value Fr_ICMD at the current peak position $NC_F$ is initialized (m1=0) to count the number m1 of additional data pieces. Then, in step S39, as the value of the next target current value Fr_ICMD, the target current value Fr_ICMD at the current peak position $NC_F$ is read out to be output to the drive control section 239A. Subsequent to step S39, the process proceeds to step S41, and m1 is count up (m1=m1+1).

In step S42, it is checked whether or not m1 is larger or equal to $\Delta N_F$. If m1 is smaller than $\Delta N_F$, the process proceeds to step S44 in FIG. 10, according to the connector (D). If m1 is larger than or equal to $\Delta N_F$, the process proceeds to step S43 to turn on the IFLAG2 (IFLAG2=1), and then proceeds to step S44 in FIG. 10, according to the connector (D). Subsequent FIG. 10 will be described later in detail. Through steps S44-S54, it is checked whether or not output of target current values Rr_ICMD has been completed. If output of target current values Rr_ICMD has not yet been completed, the process returns to step S34 in FIG. 9, according to connector (E). With Yes in step S34 as the flag IFLAGA1 is on (IFLAGA1>0), the process proceeds to step S40.

In step S40, it is checked whether or not the IFLAGA2 is larger than zero ([IFLAGA2>0?]). If the IFLAGA2 is larger than zero (Yes), the process proceeds to step S36, and if not (No), the process proceeds to step S39. With Yes in step S40, if the process proceeds to step S36, the target current value Fr_ICMD of the next sequential order is read out from the target current value temporary storage section 238a to be output to the drive control section 239A. Then, according to the connector (D), the process proceeds to steps S44-S54, though FIG. 10 being described later, and in step S54, it is checked whether or not output of target current values Rr_ICMD has been completed. If output of target current values Rr_ICMD has not yet been completed, the process returns to step S34 in FIG. 9, according to the connector (E).

In step S36, when reading of the data group of the target current values Fr_ICMD stored in the target current value temporary storage section 238a has been completed, though not shown, the data group of the target current values Fr_ICMD for the second cycle C2 of engine vibration gets stored in the target current value temporary storage section 238a. Then, drive control of the active control mount $M_F$ by the drive-pulse-control-signal output-time correction section 238 and the drive control section 239A is started. Such drive control is omitted in this flowchart for brevity.

Steps S44 to S54, which represent the process of adjusting the number of data pieces which are included in the data group of the target current values Rr_ICMD and are to be output, will be described below.

In step S44, it is determined whether or not the flag IFLAGB1 is larger than zero ([IFLAGB1>0?]). If the flag IFLAGB1 is larger than zero (Yes), the process proceeds to step S50, and if not (No), the process proceeds to step S45. At first, the above-described process of adding the target current value Rr_ICMD at the current peak position $NC_R$ in the number $\Delta N_R$ of data pieces for adjustment of the length of the target current value waveform has not yet been started, and the process accordingly proceeds to step S45. In step S45, it is checked whether or not the number of outputs of target current values Rr_ICMD has reached the position of $NC_R$ (the current peak position $NC_R$) obtained in step S7. If the number of outputs of target current values Rr_ICMD has reached the current peak position $NC_R$ (Yes), the process proceeds to step S47, and if not (No), the process proceeds to step S46. If the process is shortly after a start of outputting target current values Rr_ICMD, as the number of outputs of target current values Rr_ICMD has not yet reached the current peak position $NC_R$, the process proceeds to step S46, and a target current value Rr_ICMD of the next sequential order is read out from the target current value temporary storage section 238b and output to the drive control section 239B. Then, the process proceeds to step S54, and it is checked whether or not output of target current values Rr_ICMD has been completed. If output of target current values Rr_ICMD has not been completed yet, the process returns to step S34.

With Yes in step S45, the process proceeds to step S47, and then the IFLAGB 1 is turned on (IFLAGB1=1). Then, in step S48, a number m2 of additional data pieces for adding data pieces, in the number $\Delta N_R$, of the target current value Rr_ICMD at the current peak position $NC_R$ is initialized (m2=0) to count the number m2 of additional data pieces. Then, in step S49, as the value of the next target current value Rr_ICMD, the target current value Rr_ICMD at the current peak position $NC_R$ is read out to be output to the drive control section 239B. Subsequent to step S49, the process proceeds to step S51, and m2 is count up (m2=m2+1). In step S52, it is checked whether or not m2 is larger or equal to $\Delta N_R$. If m2 is smaller than $\Delta N_R$ (No), the process proceeds to step S54. If m2 is larger than or equal to $\Delta N_R$ (Yes), the process proceeds to step S53 to turn on the IFLAGB2 (IFLAGB2=1). Then, the process proceeds to step S54, and it is checked whether or not output of target current values Rr_ICMD has been completed. If output of target current values Rr_ICMD has not yet been completed (No), the process proceeds to S34 in FIG. 9, according to connector (E). Through steps S35-S43 or through the steps S35, S40, S36, the process proceeds to step S44. With Yes in step S44 as the flag IFLAGB1 is on (IFLAGB1>0), the process proceeds to step S50.

In step S50, it is checked whether or not the IFLAGB2 is larger than zero ([IFLAGB2>0?]). If the IFLAGB2 is larger than zero (Yes), the process proceeds to step S46, and if not (No), the process proceeds to step S49. With Yes in step S50, the process proceeds to step S46, and then the target current value Rr_ICMD of the next sequential order is read out from the target current value temporary storage section 238b to be output to the drive control section 239B. Then, the process proceeds to step S54, and it is checked whether or not output of target current values Rr_ICMD has been completed. If output of target current values Rr_ICMD has not yet been completed, the process returns to step S34. If output of target current values Rr_ICMD has been completed (Yes), anti-vibration for one cycle in a case of decrease in the rotation speed of the engine is completed.

Figure 14A:
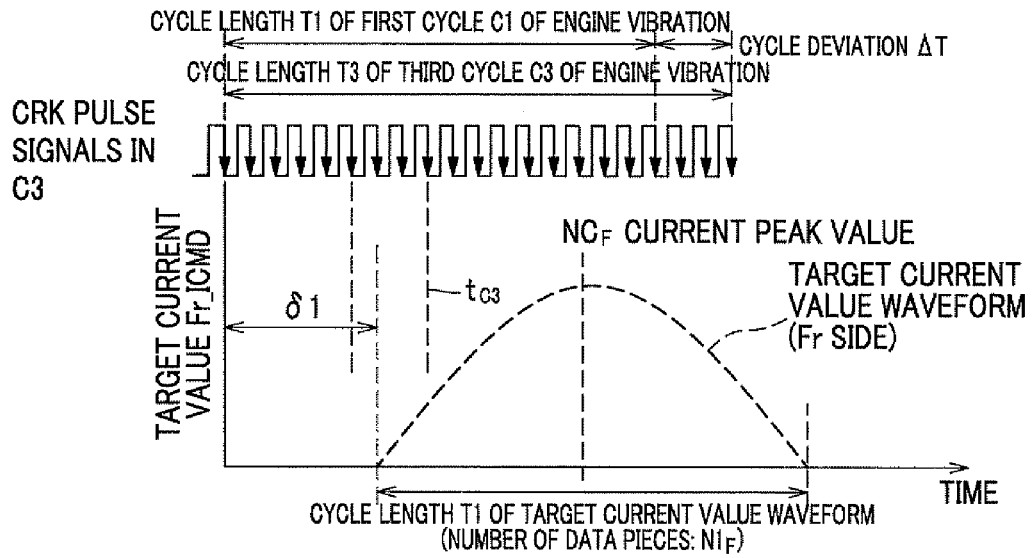
FIG. 14 is a detailed illustration of a case that the rotation speed of the engine is decelerated, showing output control that repeatedly, for a predetermined number of times, outputs the data of the target current value at the current peak position included in the data group of target current values related to a target current value waveform on Fr side in a target current output process cycle, wherein diagram (a) illustrates data of target current values Fr_ICMD on Fr side, in a number of $N1_F$ of data pieces, generated corresponding to the cycle length T1 of the first cycle C1 of the engine vibration, and a current peak position $NC_F$; diagram (b) illustrates outputting, first, target current values Fr_ICMD on Fr side up to the current peak position $NC_F$, aiming at making the number of data pieces become $N2_F$ that corresponds to the estimated cycle length T3' of the third cycle C3 of the engine vibration; and diagram (c) illustrates adding of data in a number of $\Delta N_F$ of data pieces which are the target current value Fr_ICMD at the current peak position $NC_F$, to follow the current peak position $NC_F$, and then outputting of target current values Fr_ICMD on Fr side which are subsequent to the current peak position $NC_F$.
Figure 14B:
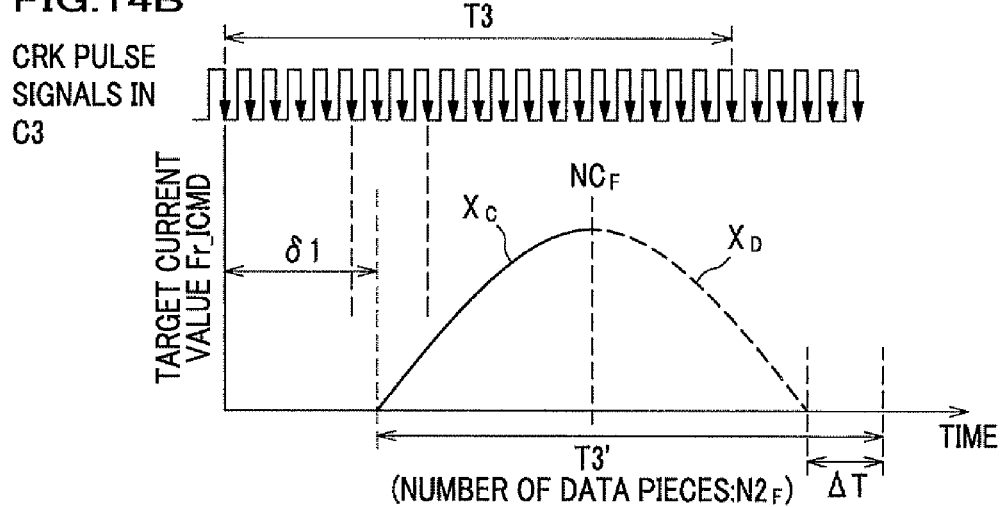
Figure 14C:
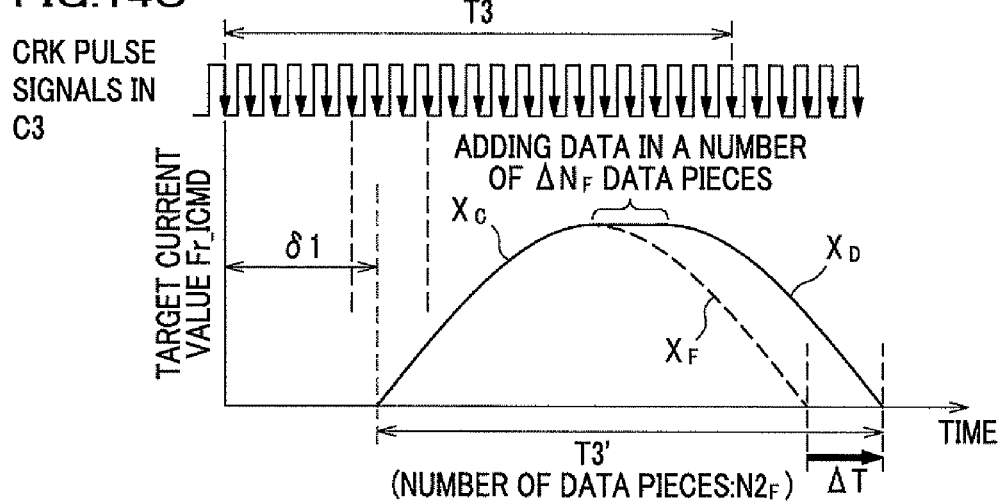

FIG. 14 is a detailed illustration of a case of deceleration of the rotation speed of the engine, showing output control that repeatedly, for a predetermined number of times, outputs the data of the target current value at the current peak position of target current values Fr_ICMD included in the data group of the target current values related to the target current value waveform on Fr side in the target current output processing cycle, wherein diagram (a) illustrates data of the target current values Fr_ICMD on Fr side, in a number of $N1_F$ of data pieces, generated corresponding to the cycle length T1 of the first cycle C1 of engine vibration and the current peak position $NC_F$; diagram (b) illustrates outputting of, first, target current values Fr_ICMD on Fr side up to the current peak position $NC_F$ so that the number of data pieces becomes $N2_F$ that corresponds to the estimated cycle length T3' of the third cycle C3 of engine vibration; and diagram (c) illustrates adding of data in a number of $\Delta N_F$ of data pieces which are the target current value Fr_ICMD at the current peak position $NC_F$, to follow the current peak position $NC_F$, and then outputting of target current values Fr_ICMD on Fr side which are subsequent to the current peak position $NC_F$.

As shown in FIG. 14, by outputting data with addition of the data in a number $\Delta N_F$ of data pieces to follow the current peak position $NC_F$, the data being at the current peak position $NC_F$, data is easily output as target current values Fr_ICMD which are symmetric with respect to the current peak position $NC_F$ as the temporal center. Accordingly, appropriate control of vibration insulation can be performed, matching with a cycle deviation $\Delta T$.

In FIG. 14, target current values Fr_ICMD on Fr side have been representatively described. Target current values Rr_ICMD on Rr side can also be likewise controlled for output, with the phase delay $\delta 2$ ($=\delta 1+\delta 0$) instead of the phase delay $\delta 1$.

Regarding the flowcharts, Step S1 corresponds to 'read process' described in claims; steps S2 to S7 correspond to 'computation process' described in claims; steps S8 to S55 correspond to 'output process' described in claims; and steps S13 to S55 correspond to 'target-current-value-waveform-length adjustment process' described in claims.

In the description of operation by the method of controlling the active anti-vibration supporting device 301 (refer to FIG. 1) in FIGS. 11 to 14, output control of target current values Fr_ICMD on Fr side by the drive-pulse-control-signal output-time correction section 238 has been described as an example. Output control of target current values Rr_ICMD on Rr side by the drive-pulse-control-signal output-time correction section 238 is likewise performed.

According to the present embodiment, in a case that the rotation speed of the engine varies, the drive-pulse-control-signal output-time correction section 238 corrects the phase delay $P1_F$ (refer to FIGS. 11 and 12) computed by the phase detection section 235 for the first cycle C1 of engine vibration with the cycle length T1, as described above, into the phase delay $\delta 1$ matching with the cycle length T3 of the third cycle C3, of engine vibration, that is a timing of driving the actuator. Further, the numbers of data pieces of target current values Fr_ICMD to be output to the drive control sections 239A, 239B are output in the number $N2_F$ of data pieces, wherein the number $N2_F$ corresponds to the estimated cycle length T3' instead of the cycle length T3 of the cycle C3. Thus, it is possible to prevent overlapping between continuous target current value waveforms.

In the case of acceleration of the rotation speed of the engine, a target current value waveform is output with a time delay $\delta 1$ that is shorter than the phase delay $P1_F$ (refer to FIG. 11) computed by the phase detection section 235.

Concretely, in the case of acceleration of the rotation speed of the engine, a target current value waveform is output with a time delay $\delta 1$ that is shorter than the phase delay $P'_F$ (refer to FIGS. 11 and 12) computed by the phase detection section 235 and also with a shorter wave length.

Figure 15:
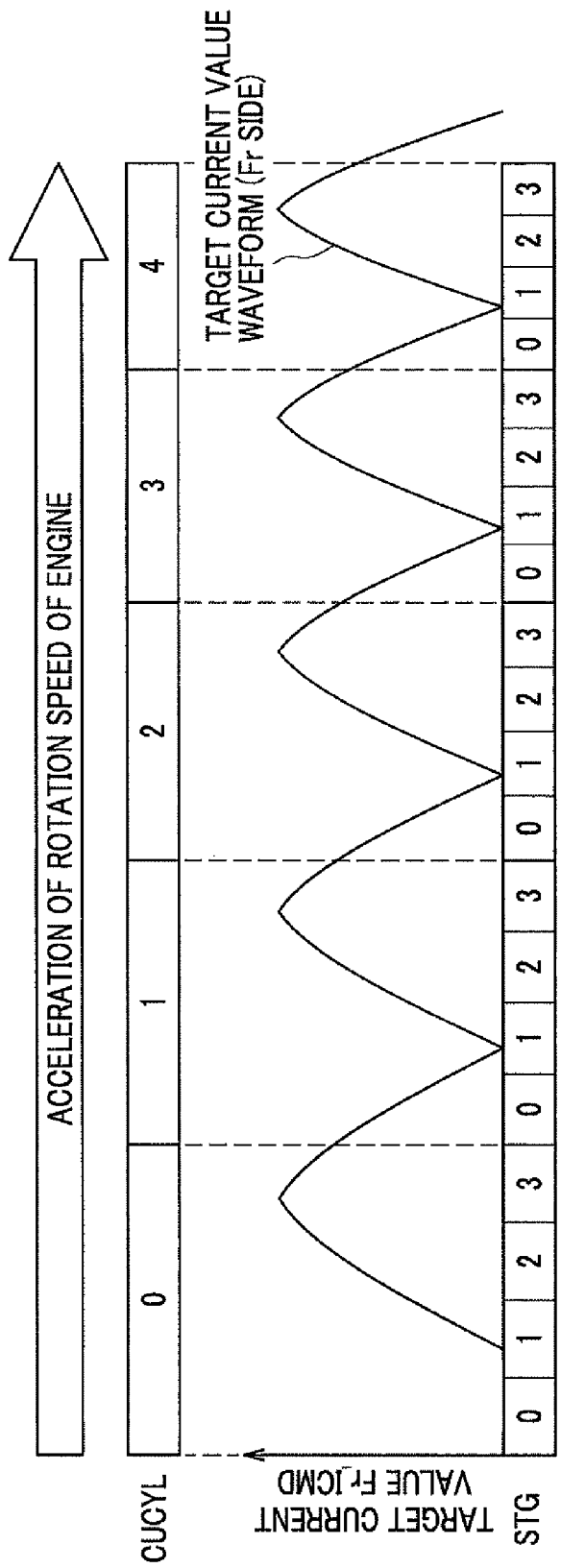
FIG. 15 is an illustration of the case that the rotation speed of the engine is accelerated, showing actual output of target current values Fr_ICMD on Fr side for five cycles of engine vibration.

FIG. 15 is an illustration of output of a target current value waveform on Fr side for five cycles of engine vibration in the case of acceleration of the rotation speed of the engine. The drive-pulse-control-signal output-time correction section 238 corrects the phase delay $P'_F$ (refer to FIG. 11) computed by the phase detection section 235 for the first cycle C1 with the cycle length T1 of engine vibration, as described above, into the phase delay $\delta 1$ matching with the cycle length T3 of the third cycle C3, of engine vibration, that is a timing of driving the actuator. Further, the wavelength of target current values to be output is shortened. Thus, it is possible to prevent overlapping between continuous target current value waveforms.

Accordingly, unlike the known technology disclosed by Patent Document 1, it is possible to enable a sufficient anti-vibration function against engine vibration without stopping current supply to the actuation section 41.

The description with reference to FIGS. 11 and 12 was made, taking an example of a case of acceleration of the rotation speed of the engine. In contrast, in a case of deceleration of the rotation speed of the engine, regarding output of a target current value waveform on Fr side as an example for description, the rotation speed of the engine is decreased, and accordingly, STG time for the number $S1_F$ of STGs in the third cycle C3 is longer than a result of the product of the number $S1_F$ of STGs and the average STG time ((T1/4) of the first cycle C1. In this case, the drive-pulse-control-signal output-time correction section 238 outputs a target current value waveform with a time delay $\delta 1$ that is longer than the phase delay $P'_F$ (refer to FIGS. 11 and 12) computed by the phase detection section 235 with respect to the first cycle C1 of engine vibration with the cycle length T1 and also with a longer wave length. Accordingly, it is also possible to perform appropriate anti-vibration control matching with decrease in the rotation speed of the engine.

Figure 16:
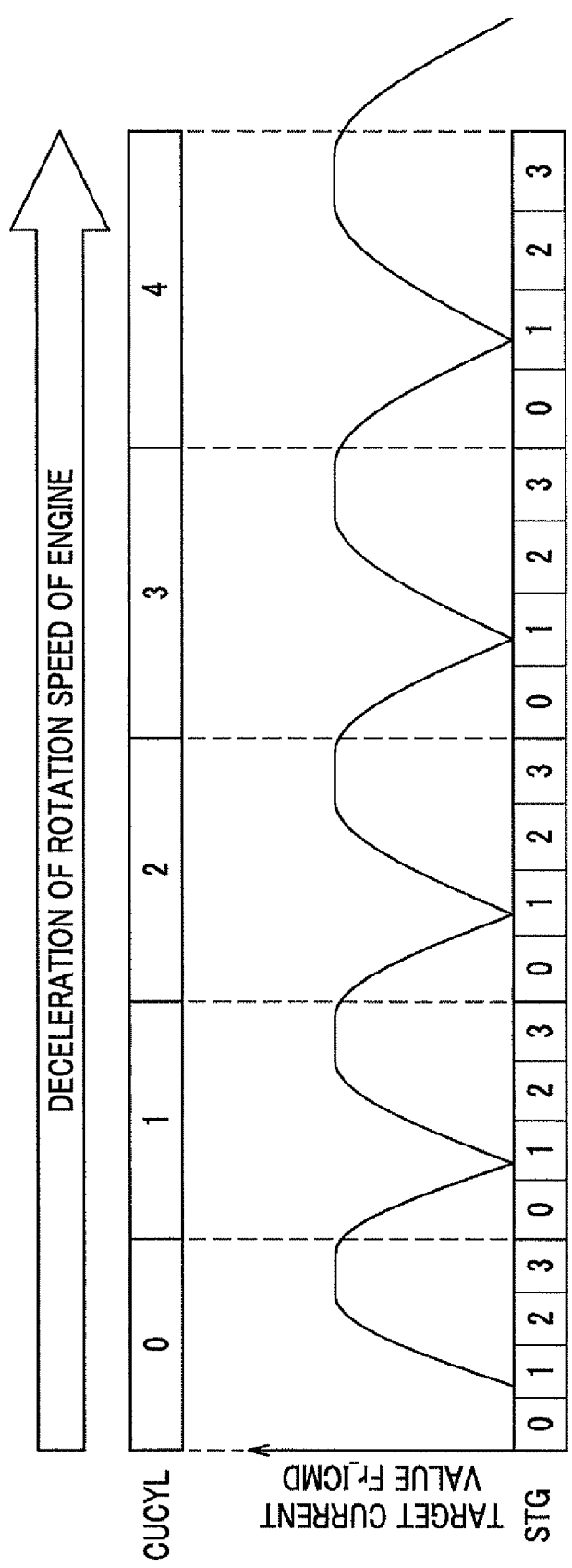
FIG. 16 is an illustration of the case that the rotation speed of the engine is decelerated, showing actual output of target current values Fr_ICMD on Fr side for five cycles of engine vibration.

FIG. 16 is an illustration of output of a target current value waveform on Fr side for five cycles of engine vibration in the case of deceleration of the rotation speed of the engine. As shown, the phase delay $P1_F$ (refer to FIG. 11) computed by the phase detection section 235 is corrected as described above into the phase delay δ1 matching with the cycle length T3 of the third cycle C3, of engine vibration, that is a timing of driving the actuator. Further, the wavelength of target current values is lengthened to be output.

Thus, output of a target current value waveform to be actually output to the drive control sections 239A, 239B (refer to FIG. 3) can be controlled for matching with the actual cycle length T3 of engine vibration at the time of output, and anti-vibration can be smoothly performed without causing cycle deviation due to acceleration/deceleration of the rotation speed of the engine. As a result, engine vibration can be efficiently reduced, and wasteful heat generation by the drive circuits 121A, 121B can be reduced.

Incidentally, in the present embodiment, by using the average STG time ((T1)/4) of the first cycle C1 in computation of the number $S1_F$ of STGs and the time remainder $P'1_F$, and the number $S1_R$ of STGs and the time remainder $P'1_R$, it is possible to compute the number $S1_F$ of STGs and the time remainder $P'1_F$, and the number $S1_R$ of STGs and the time remainder $P'1_R$ which are stable in both cases of acceleration and deceleration of the rotation speed of the engine.

MODIFIED EXAMPLE

Figure 17:
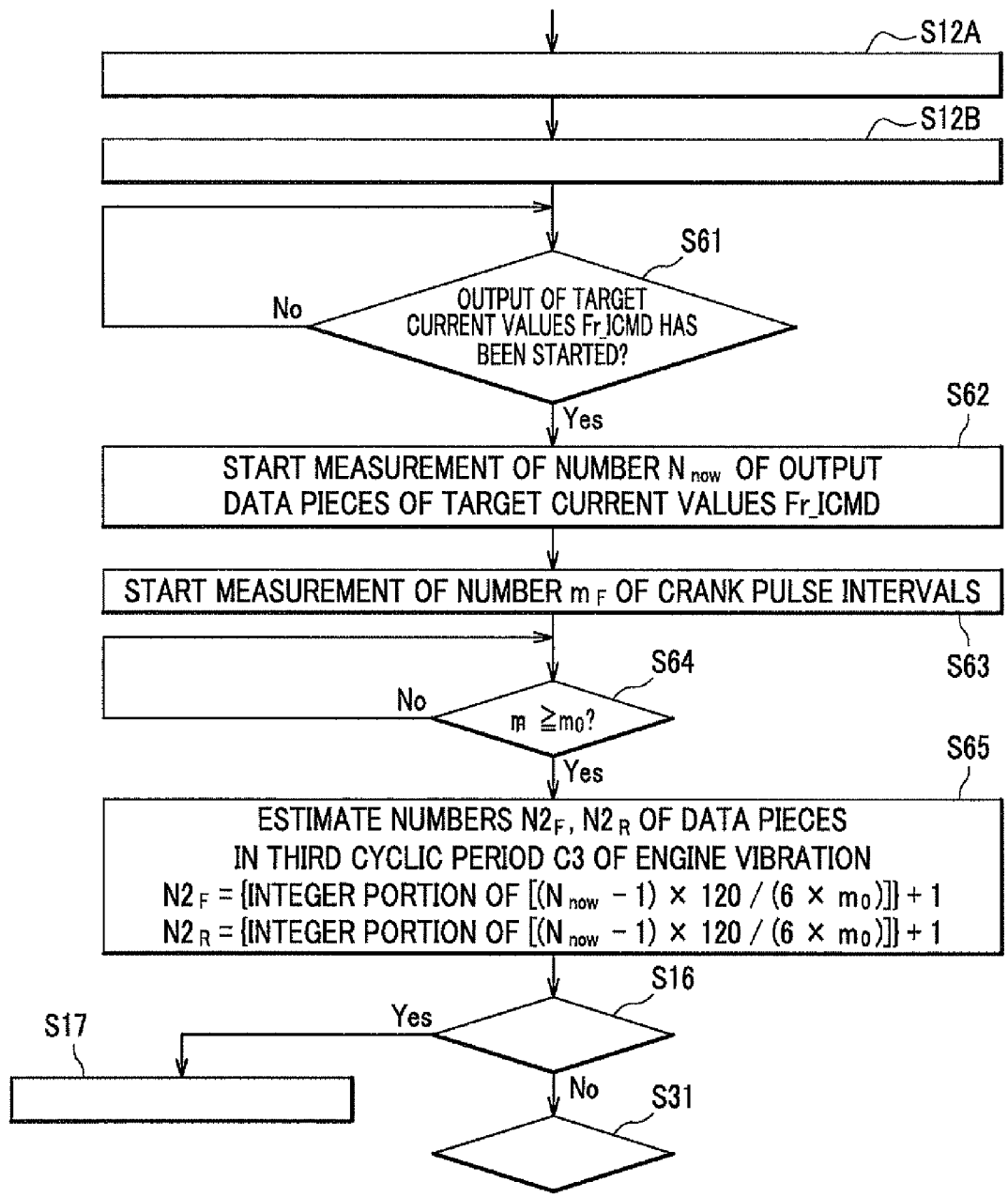
FIG. 17 is a flowchart showing a changed part of a flow of anti-vibration control in a modified example of the embodiment.

A modified example of the foregoing embodiment will be described below, referring to FIG. 17. FIG. 17 is a flowchart showing a changed part of the flow of anti-vibration control in a modified example of the embodiment.

The present modified example corresponds to claim 5. Instead of that the drive-pulse-control-signal output-time correction section 238 obtains the time $t_{C3}$ up to the time when the rotation angle has reached the predetermined crank angle DC3 in the foregoing embodiment, the actuation-pulse-control-signal output-time correction section 238 starts measuring of crank pulse intervals and measuring of a number $N_{now}$ of output data pieces of target current values Fr_ICMD, starting at the time when the drive-pulse-control-signal output-time correction section 238 has started output of the data group of target current values Fr_ICMD to the drive control section 239A. Then, the drive-pulse-control-signal output-time correction section 238 detects the number $N_{now}$ of output data pieces of target current values Fr_ICMD at the time when crank pulse intervals in a predetermined number $m_0$ have been measured, and thereby estimates the numbers $N2_F$, $N2_R$ of data pieces corresponding to the cycle length T3 of the third cycle C3 of engine vibration.

If the number $N_{now}$ of output data pieces of target current values Fr_ICMD at the time of having measured crank pulse intervals in the predetermined number $m_0$ is recognized, the drive-pulse-control-signal output-time correction section 238 can estimate the numbers $N2_F$, $N2_R$ of data pieces of target current values Fr_ICMD corresponding to the third cycle C3 of engine vibration, according to the following Expression (6).

$$N2_F = N2_R = \{\text{integer portion of } [(N_{now}-1) \times 120/(6 \times m_0)]\} + 1 \quad (6)$$

Herein, multiplication of $(N_{now}-1)$ by the sampling interval $T_{PWM}$ of 500 μsec corresponds to a required time up to the position of the $N_{now}^{th}$ data of the data group of target current values Fr_ICMD in the first cycle C1 of engine vibration. This required time corresponds to a required time for the predetermined number $m_0$ of crank pulse intervals starting at phase delay reference in the third cycle C3 of engine vibration, in other words, a required time for $(6 \times m_0)$ degrees in conversion to the crank angle. Accordingly, by proportional computation of $(N_{now}-1)$, namely multiplication of $(N_{now}-1)/(6 \times m_0)$ by 120 degrees, and adding 1 to the integer portion of the product of multiplication, the numbers $N2_F$, $N2_R$ of data pieces corresponding to the cycle length T3 of the third cycle C3 of engine vibration can be obtained.

Figure 7:
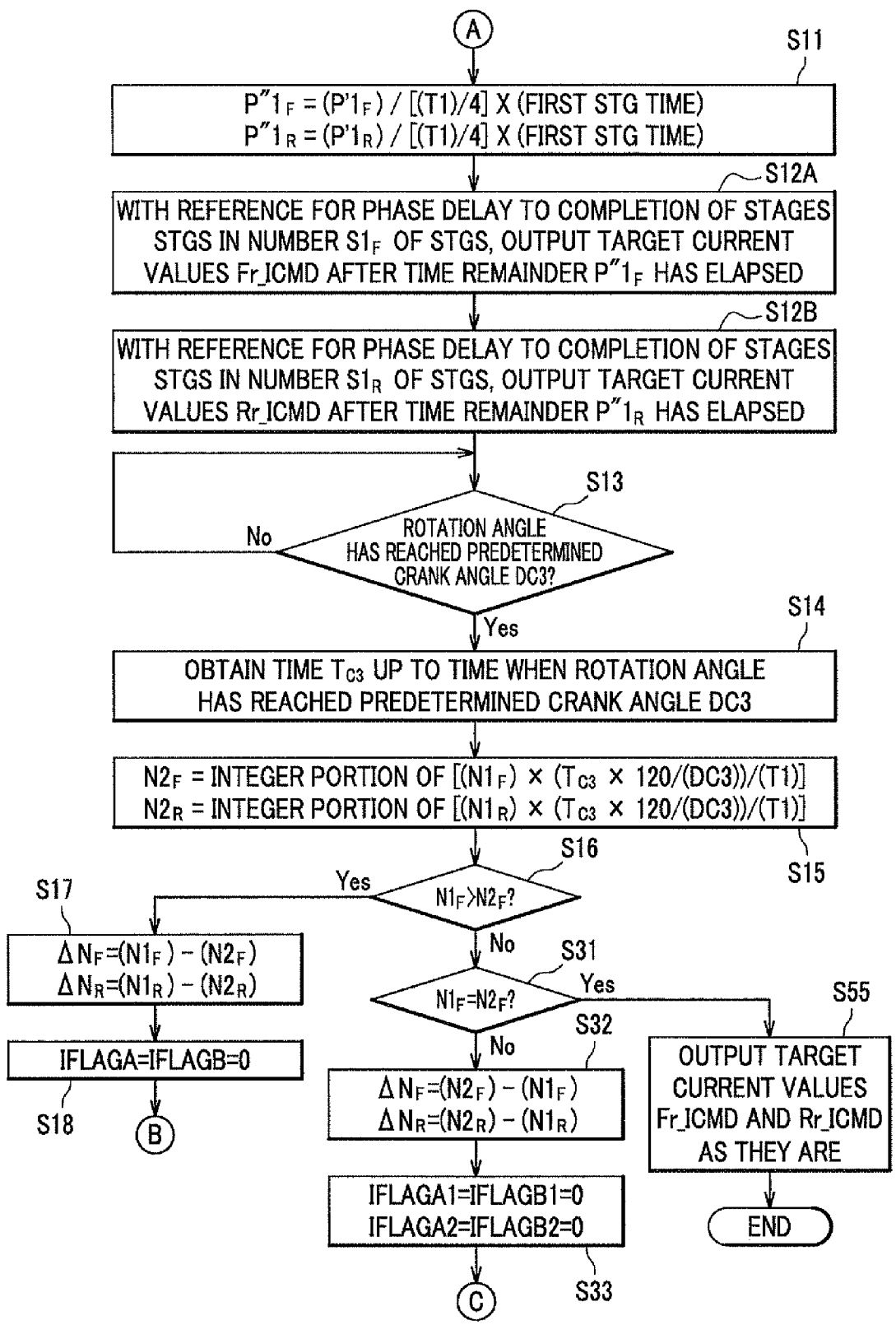
FIG. 7 is a flowchart showing a flow of the anti-vibration control.

Instead of steps S13 to S15 which are subsequent to step S12B in FIG. 7 showing the flowchart of the vibration insulation control in the foregoing embodiment, steps S61 to S65 are inserted in the present modified example, as shown in FIG. 17.

Subsequent to steps S12A and S12B, the process proceeds to step S61 to check whether or not output of the data group of target current values Fr_ICMD to the drive control section 239A has been started ('Output of target current values Fr_ICMD has been started?'). If output of the data of target current values Fr_ICMD has been started (Yes), the process proceeds to step S62, and if output of the data of target current values Fr_ICMD has not yet been started (No), the process repeats step S61.

In step S62, measurement of the number $N_{now}$ of output data pieces of target current values Fr_ICMD is started. Further, in step S63, measurement of a number $m_F$ of crank pulse intervals is started.

In step S64, it is checked whether or not the measured number $m_F$ of crank pulse intervals has become larger than or equal to the predetermined number $m_0$. If the measured number $m_F$ of crank pulse intervals has become larger than or equal to the predetermined number $m_0$ (Yes), the process proceeds to step S65, and if not, step S64 is repeated.

In step S65, the number $N_{now}$ of output data pieces of target current values Fr_ICMD at the time when the number $m_F$ of crank pulse intervals has become larger than or equal to the predetermined number $m_0$ is obtained, and the numbers $N2_F$, $N2_R$ of data pieces of the respective data groups of target current values Fr_ICMD, Rr_ICMD in the third cycle C3 of engine vibration are estimated, according to Expression (6). Then the process proceeds to step S16.

In such a manner, the drive-pulse-control-signal output-time correction section 238 starts measurement of the number of crank pulse intervals, having the start of outputting data of target current values Fr_ICMD be a start point of the measurement. When the number of crank pulse intervals measured by the drive-pulse-control-signal output-time correction section 238 has become larger than or equal to the predetermined number $m_0$, the drive-pulse-control-signal output-time correction section 238 obtains the position $N_{now}$, of the output data of a target current value Fr_ICMD, in the data group. Thus, it is possible to adjust the number of data pieces having not yet been output which is a portion of data pieces to be output from the drive-pulse-control-signal output-time correction section 238 to the drive control sections 239A, 239B, easily matching with a cycle deviation, similarly to the foregoing embodiment.

REFERENCE SYMBOLS

41 . . . actuation section (actuator)
100 . . . engine ECU (engine control device)
100a, 200a . . . ECU power supply circuit
100b . . . microcomputer
200 . . . ACM_ECU (control unit)
200b . . . microcomputer
230 . . . timing control section
231 . . . CRK-pulse-read-time temporary storage section
232 . . . CRK-pulse-interval computation section 233 ... engine rotation mode determination section
234 ... vibration state estimation section (vibration state estimation unit)
235 ... phase detection section
236 ... target current computation section (target current computation unit)
237 ... drive-pulse-control-signal generation section (target-current-value-group generation unit)
238 ... drive-pulse-control-signal output-time correction section 238 (vibration-cycle-during-driving estimation unit, output-time correction unit)
238a, 238b ... temporary storage section
239A, 239B ... drive control section (current supply control unit)
301 ... active anti-vibration supporting device
M, $M_F$, $M_R$ ... active control mount
Sa ... crank pulse sensor
Sb ... TDC sensor

The invention claimed is:

1. An active anti-vibration supporting device that supports an engine with respect to a vehicle body, comprising: a sensor for detecting rotation variation of the engine; an actuator; and a control unit for estimating a vibration state of the engine and for expandingly or contractingly driving the actuator to reduce transmission of vibration based on output from the sensor, wherein the control unit:
computes a target current value waveform for reducing transmission of vibration of the engine, using output data from the sensor, and obtains a data group of target current values from the target current value waveform in a predetermined sampling cycle;
estimates a cycle length of the engine vibration, based on a certain time defined by a rotation speed of the engine at a drive timing of the actuator driven based on the target current value waveform;
corrects a number of data pieces included in the obtained data group of target current values so that the data group of target current values comes to correspond to the estimated cycle length of the engine vibrations and then supply current to the actuator,
wherein the correction effected by the control unit is based on a position of data of a target current value, in the data group of target current values, that is output at a predetermined timing based on a signal from the sensor, such that the control unit adjusts a number of data pieces of a data portion having not yet been output of the data group of target current values which are being output so that the number of data pieces comes to correspond to a then present cycle length of the engine vibration.

2. The active anti-vibration supporting device according to claim 1,
wherein the control unit includes:
a vibration state estimation unit for estimating an amplitude and a cycle length of engine vibration, using the output data from the sensor for detecting rotation variation of the engine;
a target current computation unit for computing the target current value waveform for driving the actuator, based on the amplitude and the cycle length estimated by the vibration state estimation unit;
a target-current-value-group generation unit for obtaining the data group of target current values from the target current value waveform computed by the target current computation unit in the predetermined sampling cycle;
a vibration-cycle-during-driving estimation unit for estimating the cycle length of the engine vibration, based on the certain time defined by the rotation speed of the engine at the drive timing of the actuator;
a current supply control unit for controlling current supply to the actuator; and
an output-time correction unit that corrects the obtained data group of target current values so that the data group of target current values comes to correspond to the cycle length of the engine vibration estimated by the vibration-cycle-during-driving estimation unit, and then outputs the corrected data group of target current values to the actuator.

3. The active anti-vibration supporting device according to claim 2,
wherein the output-time correction unit:
in a case that the rotation speed of the engine is accelerated, outputs the obtained data group of target current values with a jump over a certain number of data pieces around a peak value in the obtained data group of target current values so that a number of data pieces of the data group of target current values comes to correspond to the cycle length of the engine vibration estimated by the vibration-cycle-during-driving estimation unit; and
in a case that the rotation speed of the engine is decelerated, outputs the obtained data group of target current values with a repeat of the peak value in the obtained data group of target current values for a certain number of times so that a number of data pieces of the data group of target current values comes to correspond to the cycle length of the engine vibration estimated by the vibration-cycle-during-driving estimation unit.

4. The active anti-vibration supporting device according to claim 2, wherein the output-time correction unit corrects the number of data pieces included in the data group of target current values so that the data pieces are axial-symmetric with respect to a position of a peak value in the obtained data group of target current values.

5. The active anti-vibration supporting device according to claim 1, wherein the control unit:
measures crank pulse signals from the sensor based on rotation of the engine;
in a subsequent second vibration cycle computes the target current value waveform to be applied to the actuator for anti-vibration, using data of crank pulse signals belonging to a first vibration cycle out of cycles of the engine vibration; and
in a subsequent third vibration cycle controls driving of the actuator, using the computed target current value waveform,
wherein the control unit:
in the second vibration cycle of the engine vibration,
estimates an amplitude and a cycle length of the engine vibration in the first vibration cycle of the engine vibration, using the data of the crank pulse signals belonging to the first vibration cycle of the engine vibration, and computes the target current value waveform for driving the actuator, based on the estimated amplitude and the estimated cycle length; and
further obtains a data group of target current values from the computed target current value waveform in a predetermined sampling cycle,
and in the third vibration cycle of the engine vibration,
detects the certain time defined by the rotation speed of the engine, corrects the obtained data group of target current values, based on the detected certain time, so that the corrected data group of target current values comes to correspond to a cycle length of the third vibration cycle, and then drives the actuator.

6. A method of controlling anti-vibration for an anti-vibration supporting device comprising the following steps, which are repeated as cycles:

reading by a processor output values that are in one cycle out of repeated vibration cycles of an engine, during the one cycle from a sensor for detecting rotation variation of the engine;

computing by the processor, in a first next cycle, a target current value waveform for supplying current to an actuator for anti-vibration, based on the output values from the sensor having been read in the cycle previous to the first next cycle; and outputting by the processor, in a second next cycle next to the first next cycle, a current that corresponds to the target current value waveform computed in the cycle previous to the second next cycle, to the actuator to reduce the engine vibration, wherein, the computing step involves obtaining a data group of target current values from the computed target current value waveform in a predetermined sampling cycle; and the outputting step involves, in outputting a current that corresponds to the target current value waveform in the output process in each respective cycle, detecting a certain time defined by a then rotation speed of the engine, the detection being based on acceleration/deceleration of the rotation speed of the engine, and performing a target-current-value-waveform-length adjustment process for adjusting a number of data pieces of target current values so that the number of data pieces comes to correspond to a cycle length of the then cycle of the engine vibration, wherein the target-current-value-waveform-length adjustment process is based on a position of data of a target current value, in the data group of target current values, that is output at a predetermined timing based on a signal from the sensor, such that the processor adjusts a number of data pieces of a data portion having not yet been output of the data group of target current values which are being output so that the number of data pieces comes to correspond to a then present cycle length of the engine vibration.

* * * * *